(12) United States Patent
Shimizu

(10) Patent No.: US 9,338,803 B2
(45) Date of Patent: May 10, 2016

(54) MOBILE TERMINAL, CONTROL METHOD, AND CONTROL PROGRAM

(71) Applicant: KYOCERA Corporation, Kyoto-shi, Kyoto (JP)

(72) Inventor: Ryohei Shimizu, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/411,087

(22) PCT Filed: Jun. 19, 2013

(86) PCT No.: PCT/JP2013/003808
§ 371 (c)(1),
(2) Date: May 18, 2015

(87) PCT Pub. No.: WO2014/002430
PCT Pub. Date: Jan. 3, 2014

(65) Prior Publication Data
US 2015/0257177 A1    Sep. 10, 2015

(30) Foreign Application Priority Data

Jun. 25, 2012  (JP) ................................ 2012-1414591

(51) Int. Cl.
*H04W 76/00* (2009.01)
*H04M 3/56* (2006.01)
*H04M 1/725* (2006.01)
(Continued)

(52) U.S. Cl.
CPC ........ *H04W 76/005* (2013.01); *H04M 1/72519* (2013.01); *H04M 3/56* (2013.01); *H04M 3/566* (2013.01); *H04W 4/10* (2013.01); *H04W 76/002* (2013.01); *H04M 2201/14* (2013.01); *H04M 2201/38* (2013.01); *H04W 76/045* (2013.01)

(58) Field of Classification Search
CPC . H04W 76/00; H04W 76/002; H04W 76/005; H04W 76/045; H04W 4/10; H04M 3/56; H04M 3/566; H04M 2201/14; H04M 2201/38
USPC .................................................. 455/518, 519
See application file for complete search history.

(56) References Cited

U.S. PATENT DOCUMENTS

2005/0250553 A1    11/2005  Lim
2006/0281482 A1    12/2006  Yoshida et al.
(Continued)

FOREIGN PATENT DOCUMENTS

JP    2005-318575 A    11/2005
JP    2006-135499 A     5/2006
(Continued)

OTHER PUBLICATIONS

International Search report dated Sep. 3, 2013 issued in counterpart International appiication No. PCT/JP2013/00308.

*Primary Examiner* — Raymond Dean
(74) *Attorney, Agent, or Firm* — Procopio, Cory, Hargreaves & Savitch LLP

(57) ABSTRACT

A mobile terminal having a push-to-talk (PTT) function, including: a controller that, upon detection of an operation for terminating a predefined call mode, maintains the predefined call mode for a period of predefined time, and terminates the predefined call mode upon elapse of the period; a display that displays remaining time to termination of the predefined call mode; and a remaining time changer that, upon detection of an operation for changing the remaining time, changes the remaining time according to the operation for changing the remaining time.

14 Claims, 13 Drawing Sheets

(51) Int. Cl.
  *H04W 4/10*   (2009.01)
  *H04W 76/04*  (2009.01)

(56) References Cited

U.S. PATENT DOCUMENTS

2007/0161399 A1* 7/2007 Hata ................ H04M 1/72519
                                                          455/550.1
2008/0125156 A1   5/2008  Matsui et al.
2010/0151896 A1   6/2010  Yoshida et al.

FOREIGN PATENT DOCUMENTS

| JP | 2007-028596 A | 2/2007 |
| JP | 2009-514348 A | 4/2009 |
| WO | 2007/055827 A2 | 5/2007 |

* cited by examiner

MOBILE TERMINAL, CONTROL METHOD, AND CONTROL PROGRAM

TECHNICAL FIELD

The present invention relates to mobile terminals having a push-to-talk (PTT) function, and in particular to improvements in an user interface.

BACKGROUND ART

In recent years, PTT services are becoming popular, which realize one-to-many calls among mobile terminals having a PTT function. PTT services allow for a call among multiple people, however, do not allow two or more people to speak at the same time. Therefore, a user of a mobile terminal needs to wait for another user to finish speaking, and then acquire the right to speak before starting speaking.

A mobile telephone disclosed in Patent Literature 1 has a PTT function, and has a button used for making a PTT call (hereinafter "PTT button"). Specifically, when the PTT button is pressed, the mobile telephone acquires the right to speak from a PTT management server. The mobile telephone is maintained in voice transmission mode as long as the PTT button is being pressed, during which a voice can be transmitted.

CITATION LIST

Patent Literature

[Patent Literature 1] Japanese Patent Application Publication No. 2005-318575

SUMMARY OF INVENTION

Technical Problem

However, with the mobile telephone disclosed in Patent Literature 1, the user loses the right to speak when releasing the PTT button. Therefore, if the user mistakenly releases the PTT button during a PTT call, the call is disconnected unintentionally. If all the users are accustomed to PTT services, it is unlikely that disconnection as described above occurs. However, if any of the users are not accustomed, unintended disconnection might occur.

The present invention is made in view of the problem described above, and aims to provide a mobile terminal, a control method, and a control program, that are capable of preventing unintended disconnection of a call when the PTT button is released.

Solution to Problem

To solve the problem, one aspect of the present invention provides a mobile terminal having a push-to-talk (PTT) function, comprising: a controller that, upon detection of an operation for terminating a predefined call mode, maintains the predefined call mode for a period of predefined time, and terminates the predefined call mode upon elapse of the period; a display that displays remaining time to termination of the predefined call mode; and a remaining time changer that, upon detection of an operation for changing the remaining time, changes the remaining time according to the operation for changing the remaining time.

Another aspect of the present invention is a method for controlling a mobile terminal having a push-to-talk (PTT) function, comprising: maintaining, upon detection of an operation for terminating a predefined call mode, the predefined call mode for a period of predefined time, and terminating the predefined call mode upon elapse of the period; displaying remaining time to termination of the predefined call mode; and changing, upon detection of an operation for changing the remaining time, the remaining time according to the operation for changing the remaining time.

Another aspect of the present invention is a control program for controlling a mobile terminal having a push-to-talk (PTT) function, the control program causing the mobile terminal to perform the steps of: maintaining, upon detection of an operation for terminating a predefined call mode, the predefined call mode for a period of predefined time, and terminating the predefined call mode upon elapse of the period; displaying remaining time to termination of the predefined call mode; and changing, upon detection of an operation for changing the remaining time, the remaining time according to the operation for changing the remaining time.

Effects of Invention

The present invention provides a mobile terminal, a control method, and a control program, that are capable of preventing unintended disconnection of a PTT call.

DESCRIPTION OF EMBODIMENTS

The following describes an embodiment of a mobile terminal pertaining to the present invention.

Embodiment 1

1-1. Overview

Figure 1:
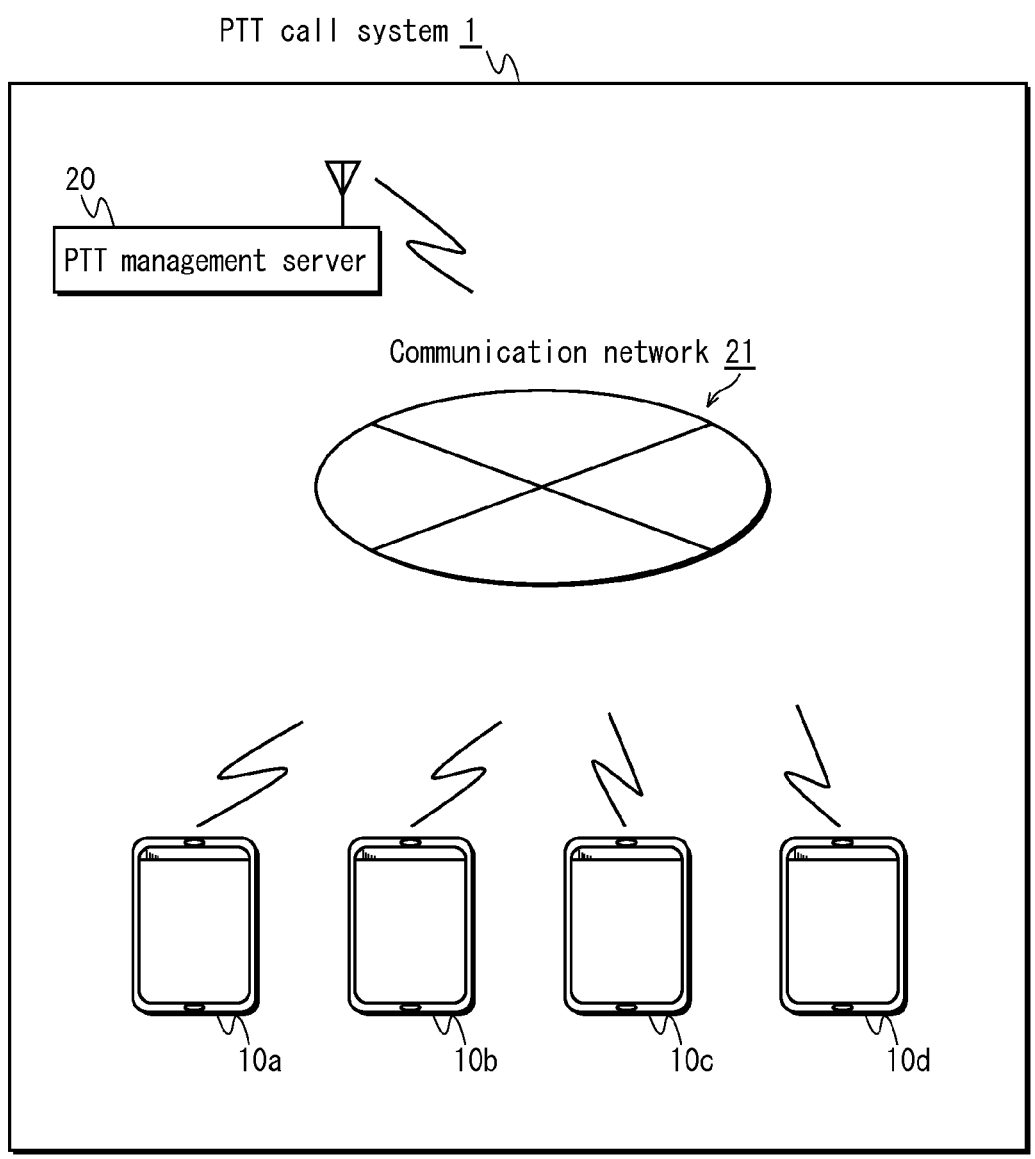
FIG. 1 is a schematic diagram illustrating a configuration of a PTT call system 1.

FIG. 1 is a schematic diagram illustrating a configuration of a PTT call system 1 using the mobile terminal 10 pertaining to the present embodiment.

The following briefly describes the PTT call system 1 with reference to FIG. 1.

The PTT call system 1 includes mobile terminals 10a through 10d, a PTT management server 20, and a communication network 21.

Each of the mobile terminals 10a through 10d has a PTT function which realizes a one-to-many call.

The PTT management server 20 has the function of managing participation into and withdrawal from a PTT session, the function of managing the right to speak, and the function of transmitting a speaker's voice to the mobile terminals participating in the PTT session.

The mobile terminals 10a through 10d connects to the PTT management server 20 via the communication network 21. The PTT management server 20 manages the mobile terminals 10a through 10d as a call group, and establishes a PTT session with the mobile terminals 10a through 10d. When a PTT session is established, only the mobile terminal that has acquired the right to speak from the PTT management server 20 is allowed to transmit a voice. The voice is transmitted to all the mobile terminals in the call group via the PTT management server 20. Note that the right to speak is authority to transmit a voice, which is managed by the PTT management server 20 and is given to a mobile terminal in response to a request from the mobile terminal. Only the mobile terminal that has acquired the right to speak is allowed to transmit a voice. While the right to speak is being held by one mobile terminal, the PTT management server 20 cannot give the right to speak to another mobile terminal in the same call group. In other words, when one mobile terminal holds the right to speak, the other mobile terminals in the same group cannot acquire the right to speak.

Figure 2:
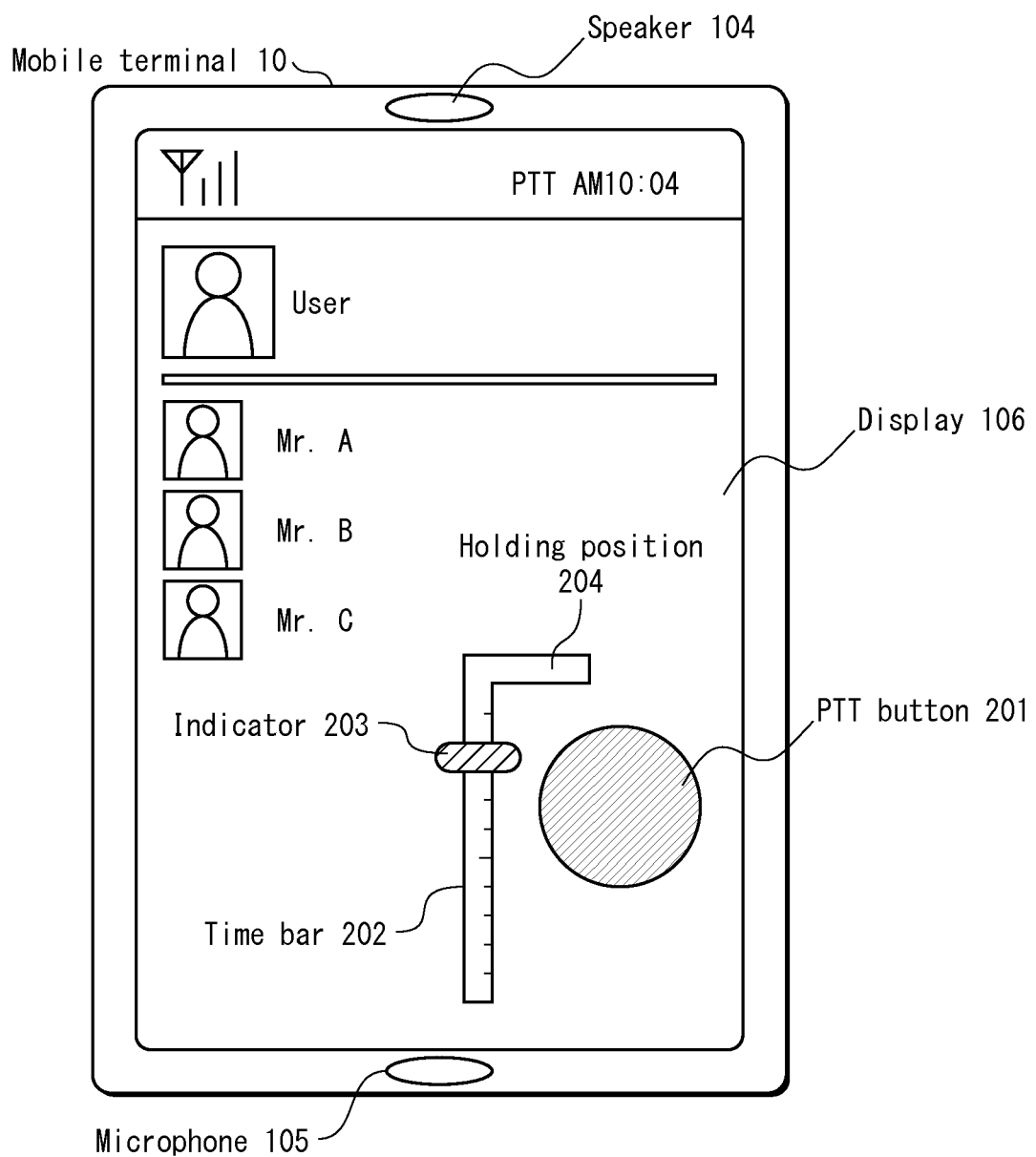
FIG. 2 is schematic diagram illustrating an exterior appearance of a mobile terminal 10.

FIG. 2 is a schematic diagram illustrating the exterior appearance of the mobile terminal 10.

The mobile terminal 10 operates according to an instruction from a touch panel thereof.

To acquire the right to speak, the user touches and keeps holding a PTT button 201 displayed in a display 106. When finishing speaking, the user stops holding the PTT button 201 and relinquishes the right to speak. Generally, a touch panel does not have convexities or concavities, and the user can not feel the PTT button 201 when touching the PTT button 201. Hence, it is not easy for the user to keep holding the PTT button 201 displayed on the display 106. Therefore, the user might unintentionally release the PTT button 201 even during speaking. Considering this, the mobile terminal 10 does not transmit a notification of relinquishment of the right to speak to the PTT management server 20 even when the user unintentionally releases the PTT button 201, and remains in the same state as when the PTT button 201 is being touched, until a predefined period elapses. Thus, the mobile terminal 10 prevents unintentional relinquishment of the right to speak when the user mistakenly stops holding the PTT button 201.

In such cases, however, after the user stops holding the PTT button 201, it is difficult for the user to know the length of time left until the relinquishment of the right to speak. Considering this, the mobile terminal 10 displays a time bar 202 and an indicator 203 on the display 106 as illustrated in FIG. 2, and allows the user to know the remaining time by continuously changing the display position of the indicator 203. Note that the expression "remaining time" used in the present embodiment is the time from when the user stops holding the PTT button 201 to when the right to speak is relinquished. Even after the user stops holding the PTT button 201, the mobile terminal 10 remains in the same state as when the user keeps holding the PTT button 201, until the remaining time becomes zero, i.e., until the indicator 203, which moves over time, reaches the bottom end of the time bar 202. In other words, the user can maintain the right to speak for a predefined period without keeping holding the PTT button 201. Thus, the stated configuration reduces the user's burden for pressing the button, and reduces the load onto the touch panel as well. Furthermore, the mobile terminal 10 extends the remaining time when the PTT button 201 is touched again before the remaining time becomes zero. Therefore, when the remaining time is running out, the user can extend the remaining time by touching the PTT button 201 again. In other words, the user can maintain the right to speak until the end of the PTT call, by touching the PTT button 201 as necessary instead of keeping holding the PTT button 201 throughout the call.

The following describes in detail the mobile terminal 10 used in the PTT call system 1.

1-2. Configuration

Figure 3:
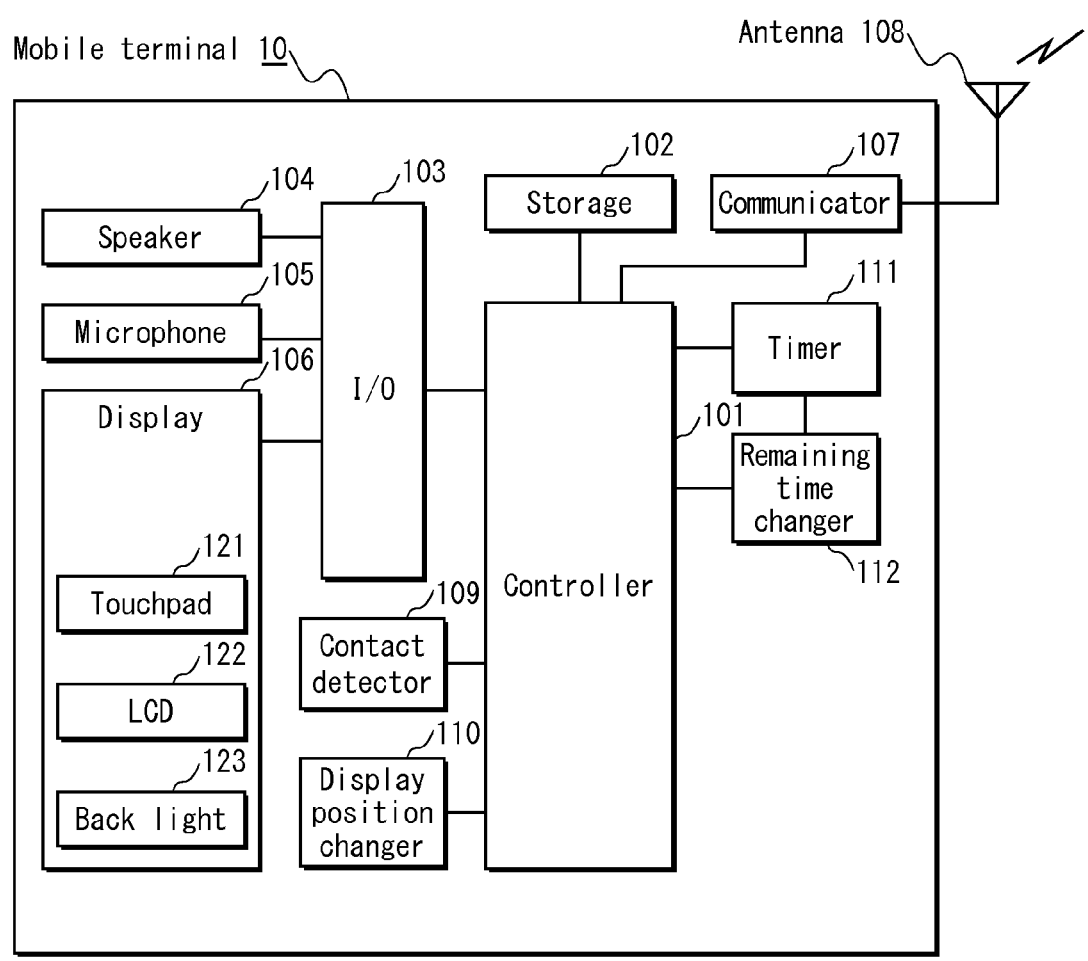
FIG. 3 is a functional block diagram illustrating primary components of the mobile terminal 10.

FIG. 3 is a functional block diagram illustrating primary components of the mobile terminal 10.

As illustrated in the figure, the mobile terminal 10 includes a controller 101, a storage 102, an I/O 103, a speaker 104, a microphone 105, a display 106, a communicator 107, an antenna 108, a contact detector 109, a display position changer 110, a timer 111, and a remaining time changer 112.

The controller 101 has The function of controlling the mobile terminal 10, which is common to general mobile terminals, the function of controlling display on the display 106, the function of controlling input and output of the speaker 104 and the microphone 105 via the I/O 103, and the function of controlling PTT sessions.

The controller 101 includes a central processing unit (CPU), read only memory (ROM), and non-volatile memory (e.g. flash memory). The functions of the controller 101 are realized by the CPU executing control programs stored in the ROM.

The storage 102 is made up from a storage medium such as non-volatile memory, and stores the value of the maximum time (e.g. 30 seconds) for which the user is allowed to speak after acquiring the right to speak once.

The I/O 103 is an input/output interface. The speaker 104, the microphone 105 and the display 106 exchange data with the controller 101 via the I/O 103.

The display 106 includes a touchpad 121, a liquid crystal display (LCD) 122, and a back light 123.

The touchpad 121 is provided on the surface of the LCD 122. The touchpad 121 (e.g. a capacitance-type touch sensor) is an input device that receives touch operations on a display object displayed on the LCD 122. A controller IC (not illustrated) included in the touchpad 121 detects whether the user's finger, for example, has contacted the touchpad 121, every predefined unit of time (e.g. every 25 msec.). When detecting contact, the controller IC sends the coordinate values of the contact point to the controller 101.

Touch operations include a tap, a double tap, a long tap, a flick, a slide, a drag, and so on.

The following specifically describes these touch operations.

A tap is an operation of touching the touchpad 121 with a finger and releasing the finger from the touchpad 121 within a short period.

A double tap is an operation of repeating a tap on the touchpad 121 twice within a short period.

A long tap is an operation of holding a finger on the touchpad 121 for a predefined period and then releasing the finger from the touchpad 121.

A flick is an operation of quickly brushing the touchpad 121 with a finger towards a given direction. More specifically, a flick is an operation of touching the touchpad 121 with a finger and brushing the touchpad with the finger towards a given direction at a given speed.

A slide is an operation of touching the touchpad 121 with a finger and moving the finger towards a given direction while keeping the finger in contact with the touchpad 121. A slide may also refer to a drag, which is an operation of touching a display object (e.g. an icon used for starting up an application, a shortcut icon, a file, a folder, etc.) displayed on the LCD 122 with a finger and moving the object.

The LCD 122 has a function of displaying a display object such as a text and an image at a specified position according to an instruction from the controller 101.

The back light 123 is, for example, a device such as a light emitting diode (LED), and serves as a light source for illumination, emitting light from the rear side of the LCD 122.

The speaker 104 outputs, for example, a voice during a voice call and warning sound during operation of the mobile terminal 10.

The microphone 105 receives input of a voice. For example, the microphone 105 receives input of the user's voice during a call.

The communicator 107 is a wireless communication circuit that performs wireless communication with a base station via the antenna 108. The communicator 107 performs wireless communication with the external PTT management server 20 via a base station, and wireless communication common to mobile telephones.

The contact detector 109 has the function of detecting a tap operation onto the PTT button 201 and determining whether a drag operation on the indicator 203 has been performed or not, with reference to coordinate values received via the controller 101.

The display position changer 110 has the function of calculating the display position of the indicator 203 according to the value of the remaining time. The display position changer 110 calculates the display position of the indicator 203 based on the value of the remaining time continuously updated by the timer 111 and on the result of the detection by the contact detector 109 received from the controller 101, and sends to the controller 101 the coordinate values of the display position of the indicator 203 to be displayed on the display 106.

The timer 111 has the function of measuring the elapsed time from a given operation (e.g. an operation of touching then releasing the PTT button 201) performed by the user, continuously updating the value of the remaining time according to the elapsed time, and sending the updated value of the remaining time to the controller 101 and the remaining time changer 112. Note that the expression "the value of the remaining time" is the value of a variable that represents time and is used in the processing within the mobile terminal 10. In the following explanation, the expression "the value of the remaining time" is used in this sense. In the following explanation, the expression "countdown" means continuously updating the remaining time to decrement the remaining time.

The remaining time changer 112 has the function of changing the value of the remaining time upon receiving a tap operation onto the PTT button 201, a drag operation on the indicator 203, or information related to the remaining time from the external PTT management server 20, and sending the value of the remaining time so changed to the controller 101 and the timer 111.

1-3. Operations

Figure 4:
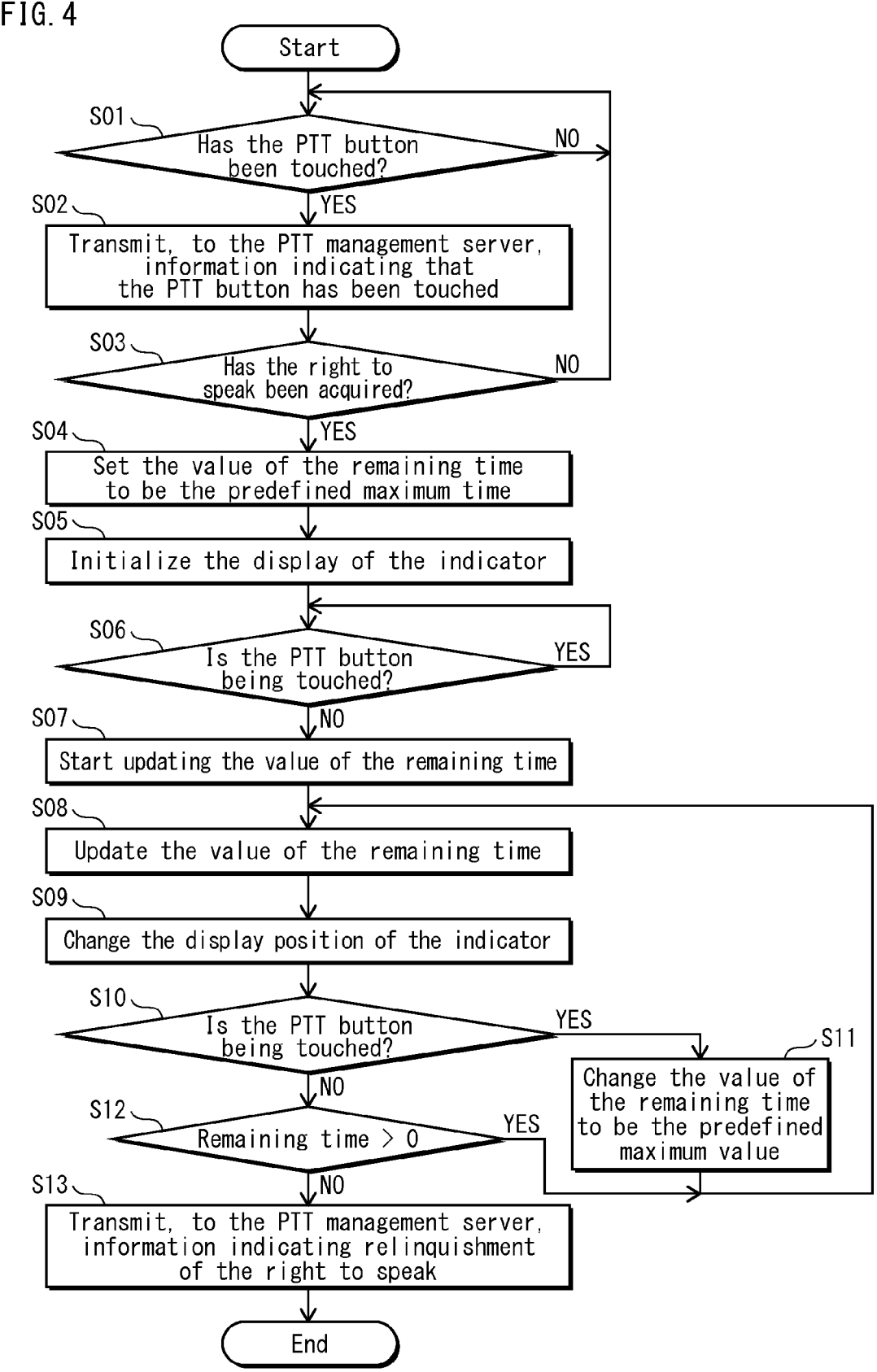
FIG. 4 is a flowchart illustrating processing performed when a PTT button of the mobile terminal 10 pertaining to Embodiment 1 is operated.

The following describes operations of the mobile terminal 10 having the above-described configuration, with reference to FIG. 4.

Suppose that the mobile terminal 10 is connected to the PTT management server 20, and a PTT session has been established.

FIG. 4 is a flowchart illustrating processing performed by the mobile terminal 10 when the user operates the PTT button 201.

As illustrated in FIG. 2, the PTT button 201, the time bar 202 and the indicator 203 are displayed on the display 106 of the mobile terminal 10. The PTT button 201 receives a tap operation, and the indicator 203 receives a drag operation.

First, the contact detector 109 determines whether the PTT button 201 displayed on the display 106 has been touched or not (Step S01). Specifically, the contact detector 109 determines that the PTT button 201 has been touched when the coordinate values of the contact point on the touchpad 121, received from the controller 101, are within the display range of the PTT button 201.

When it is determined that the PTT button 201 has been touched (Step S01: YES), the communicator 107 transmits information indicating that the PTT button 201 has been touched, to the PTT management server 20 via the antenna 108 (Step S02).

When receiving from the mobile terminal 10 the information indicating that the PTT button 201 has been touched, the PTT management server 20 transmits information indicating acceptance of the request for the right to speak to the mobile terminal 10 if the right to speak is not being held by any other mobile terminals participating in the PTT session. If any one of the mobile terminals is holding the right to speak, the PTT management server 20 transmits information indicating denial of the request for the right to speak to the mobile terminal 10.

The communicator 107 transmits to the controller 101 the information received from the PTT management server 20 via the antenna 108, which indicates acceptance or denial of the request for the right to speak. Based on the information, the controller 101 determines whether the mobile terminal 10 has successfully acquired the right to speak or not (Step S03). Specifically, when receiving the information indicating acceptance, the controller 101 determines that the mobile terminal 10 has successfully acquired the right to speak, and when receiving the information indicating denial, the controller 101 determines that the mobile terminal 10 has failed to acquire the right to speak.

When the mobile terminal 10 fails to acquire the right to speak (Step S03: NO), the processing returns to Step S01 and the mobile terminal 10 is brought into standby mode.

On the other hand, when the mobile terminal 10 acquires the right to speak (Step S03: YES), the controller 101 sets the value of the remaining time to the relinquishment of the right to speak to be the maximum time (e.g. 30 seconds) stored in the storage 102 in advance, and sends the value of the remaining time to the timer 111 (Step S04).

The display position changer 110 calculates the coordinate values of the display position of the indicator 203 when the value of the remaining time indicates the maximum time, and sends the coordinate values to the controller 101. The controller 101 instructs the display 106 to display the indicator 203 at the position specified by the coordinate values, and the display 106 displays the indicator 203 at the position indicated by the coordinate values (Step S05).

Next, the contact detector 109 determines whether the PTT button 201 is being touched or not (Step S06). Specifically, while the coordinate values of the contact point on the touchpad 121 detected every unit time (e.g. every 25 msec.) remain within the display range of the PTT button 201, the contact detector 109 determines that the PTT button 201 is being touched. When determining that the coordinate values are not within the display range of the PTT button 201, the contact detector 109 determines that the PTT button 201 is no longer being touched. When it is determined that the PTT button 201 is being touched (Step S06: YES), the right to speak is maintained, and the value of the remaining time is not updated.

When it is determined that the PTT button 201 is no longer being touched (Step S06: NO), the timer 111 starts updating the value of the remaining time (Step S07), and continuously updates the value of the remaining time until relinquishment of the right to speak according to the elapsed time from the point when it is detected that the PTT button 201 is no longer being touched (Step S08).

The display position changer 110 continuously receives the value of the remaining time from the timer 111, and calculates the coordinate values used for chanting the display position of the indicator 203 on the display 106 according to the remaining time (Step S09). Specifically, the top end of the time bar is the display position of the indicator 203 when the value of the remaining time is the predefined maximum time, and the bottom end of the time bar 202 is the display position of the indicator 203 when the remaining time is zero. When L0 denotes the length of the time bar 202 between the top end and the bottom end, T0 denotes the maximum value of the remaining time, and T denotes the actual remaining time, the display position changer 110 calculates length L corresponding to the actual remaining time T by $L=L0 \times T/T0$ and then calculates the coordinate values of the point having a distance L along the time bar 202 from the bottom end of the time bar 202. The display position changer 110 sends the coordinate values to the controller 101. The controller 101 instructs the display 106 to display the indicator 203 at the position specified by the coordinate values, and the display 106 displays the indicator 203 at the position indicated by the coordinate values.

When the contact detector 109 detects a touch operation onto the PTT button 201 while the value of the remaining time is being continuously updated over time (Step S10: YES), the remaining time changer 112 changes the value of the remaining time to the maximum time (e.g. 30 seconds) stored in the storage 102 in advance (Step S11), and then the processing from Step S08 is repeated. For example, when the predefined maximum value of the remaining time is 30 seconds and 10 seconds has elapsed since the user released the PTT button 201, the remaining time is 20 seconds. If the user touches the PTT button 201 again, the remaining time changer 112 changes the value of the remaining time from 20 seconds to 30 seconds.

When it is determined that the PTT button 201 remains untouched (Step S10: NO), the controller 101 determines whether the updated value of the remaining time is zero or not (Step S12). Note that whether or not the PTT button 201 remains untouched is determined based on whether the coordinate values of the contact point on the touchpad 121 detected every unit of time (e.g. every 25 msec.) remain out of the display range of the PTT button 201 after the contact detector 109 determines in Step S06 that the PTT button 201 is not being touched. When the coordinate values of the contact point on the touchpad 121 remains out of the display range of the PTT button 201, it is determined that the PTT button 201 remains untouched, and when the coordinate values are within the display range of the PTT button 201, it is determined that the PTT button 201 has been touched again.

When the value of the remaining time is not zero (Step S12: YES), the processing from Step S08 is repeated, and the timer 111 continuously updates the value of the remaining time over time.

When the remaining time runs out (Step S12: NO), the controller 101 relinquishes the right to speak, and brings the mobile terminal 10 into the standby mode. The communicator 107 then transmits information indicating the relinquishment of the right to speak, to the PTT management server 20 via the antenna 108 (Step S13).

The following describes operations of the PTT management server 20 when receiving the information indicating the relinquishment of the right to speak.

Figure 5:
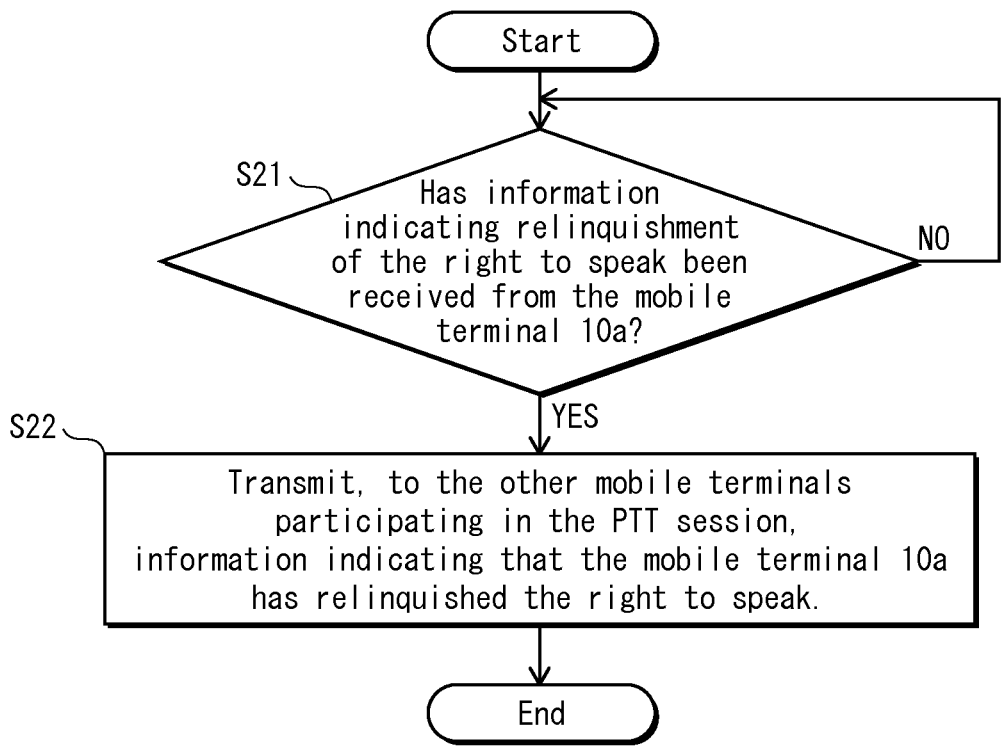
FIG. 5 is a flowchart illustrating processing performed by a PTT management server 20 when receiving information indicating relinquishment of the right to speak.

FIG. 5 is a flowchart illustrating processing performed by the PTT management server 20 when receiving the information indicating the relinquishment of the right to speak.

In the following, suppose that the mobile terminals 10a through 10d are in the same call group participating in PTT session, and the mobile terminal 10a has transmitted the information indicating the relinquishment of the right to speak to the PTT management server 20 in Step S13 shown in FIG. 4.

When receiving the information indicating the relinquishment of the right to speak from the mobile terminal 10a (Step S21: YES), the PTT management server 20 transmits information indicating that the mobile terminal 10a has relinquished the right to speak to the mobile terminals 10b through 10d participating in the PTT session (Step S22). In response to the processing in Step S22, the information indicating the relinquishment of the right to speak is displayed on the mobile terminals 10b through 10d. The information indicating the relinquishment of the right to speak is displayed on the mobile terminal 10a as well. Therefore, the users of the mobile terminal 10a and the mobile terminals 10b through 10d can recognize that they can acquire the right to speak. The users can acquire the right to speak in the same manner as the mobile terminal 10a and then speak.

Figure 6:
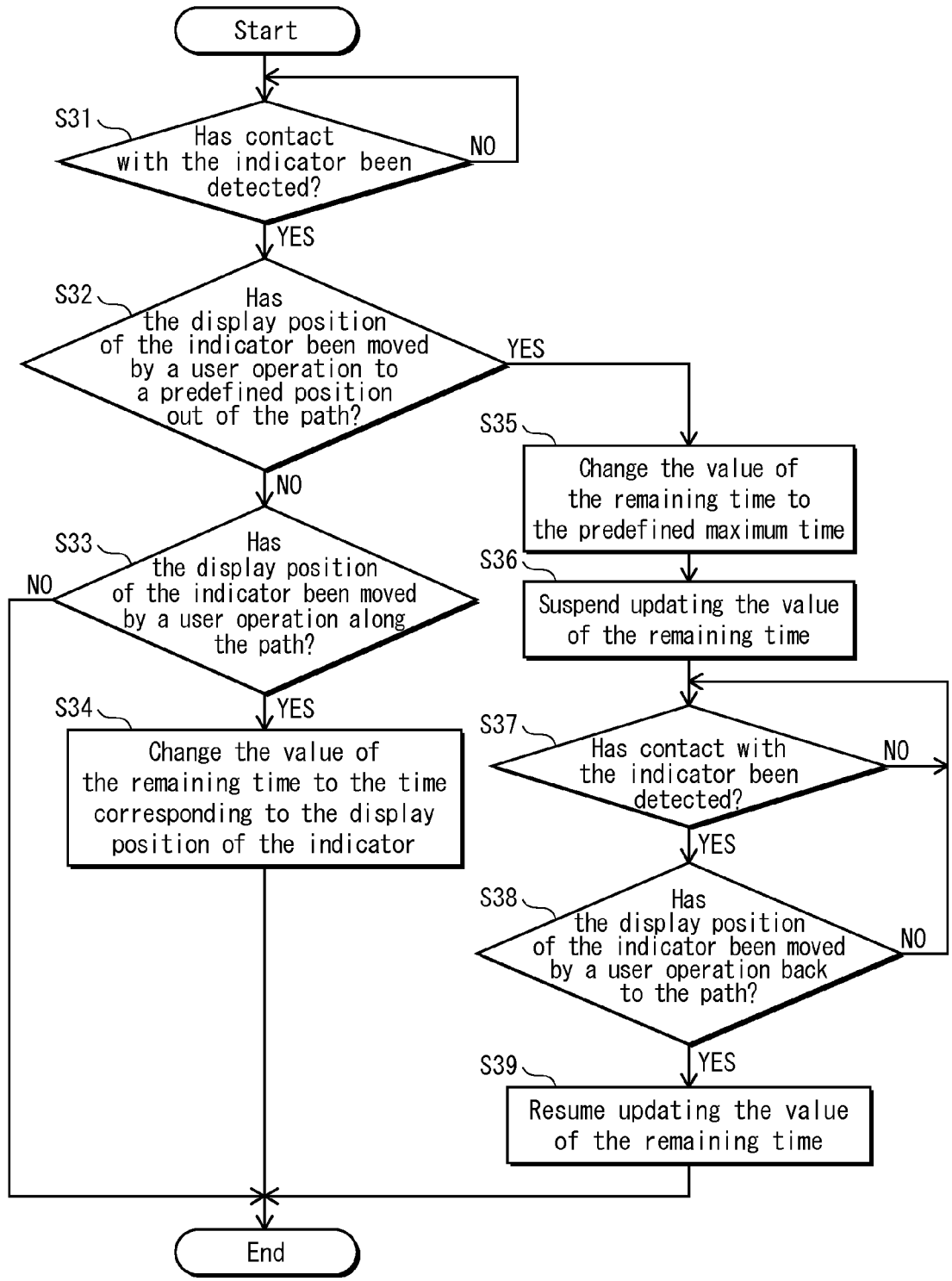
FIG. 6 is a flowchart illustrating processing performed when an indicator of the mobile terminal 10 pertaining to Embodiment 1 is operated.

Next, referring to FIG. 6, the following explains operations for changing the remaining time by operating the display position of the indicator 203 under the condition that the PTT button 201 has been released after the acquisition of the right to speak, but the right to speak has not been relinquished yet.

FIG. 6 is a flowchart illustrating processing performed by the mobile terminal 10 when the user performs a drag operation on the indicator 230 to change the remaining time.

First, the contact detector 109 detects whether the indicator 203 displayed on the display 106 is being touched or not (Step S31). Specifically, the contact detector 109 determines that the indicator 203 is being touched when the coordinate values of the contact point on the touchpad 121, which are detected every unit time (e.g. every 25 msec.), are within the display range of the indicator 203.

When contact with the indicator 203 is detected (Step S31: YES), the display position changer 110 determines whether the display position of the indicator 203 has been changed to a holding position 204 by a user operation (Step S32). Specifically, the display position changer 110 determines whether the indicator 203 has been dragged to the range of the holding position 204 based on the coordinate values of the contact point received from the controller 101. When the position of the indicator 203 is within the range of the holding position 204, the display position changer 110 determines that the display position of the indicator 203 has been moved to the holding position 204.

When it is determined that the display position of the indicator 203 has been moved to the holding position 204 (Step S32: YES), the remaining time changer 112 changes the value of the remaining time to the value stored in the storage 102 in advance (e.g. 30 seconds) (Step S35), and the timer 111 suspends updating the value of the remaining time (Step S36).

When the contact detector 109 detects a contact with the indicator 203 under such a condition (Step S37: YES), the display position changer 110 determines whether the indicator 203 has been moved onto the time bar 202 by a user operation (Step S38). Specifically, when determining that the indicator 203 has been moved into the display range of the time bar 202 by a drag operation based on the coordinate values of the contact point on the touchpad 121 continuously received from the controller 101 every unit time, the contact detector 109 determines that the indicator 203 has been moved onto the time bar 202.

The remaining time changer 112 calculates the value of the remaining time corresponding to the display position of the indicator 203 on the time bar 202. The remaining time changer 112 then changes the value of the remaining time to the value so calculated, and sends the value of the remaining time after change to the timer 111. Time T corresponding to the display position of the indicator 203 is calculated by, for example, $T=T0 \times L/L0$, where L0 denotes the length of the time bar, T0 denotes the maximum value of the remaining time, and L denotes the length between the bottom end of the time bar 202 and the indicator 203.

The timer 111 receives the value of the remaining time from the remaining time changer 112, and resumes updating the value of the remaining time (Step S39).

On the other hand, in the case of NO in Step S32, the contact detector 109 determines whether the display position of the indicator 203 on the time bar 202 has been changed, and when determining that the display position of the indicator 203 has been changed, the contact detector 109 sends the coordinate values to the display position changer 110 (Step S33). Specifically, the contact detector 109 obtains the coordinate values of the indicator 203 after the drag operation based on the coordinate values of the contact point on the touchpad 121 detected every unit time (e.g. every 25 msec.).

When it is determined that the display position of the indicator 203 on the time bar 202 has been changed (Step S33: YES), the remaining time changer 112 calculates the remaining time corresponding to the display position of the indicator 203 on the time bar 202, and changes the value of the remaining time to the value thus calculated (Step S34). The calculation of the remaining time corresponding to the display position is performed in the same manner as already explained above as to Step S38.

In the case of NO in Step S33, the processing is terminated.

1-4. Supplemental Descriptions (PTT Call System 1)

Figure 7:
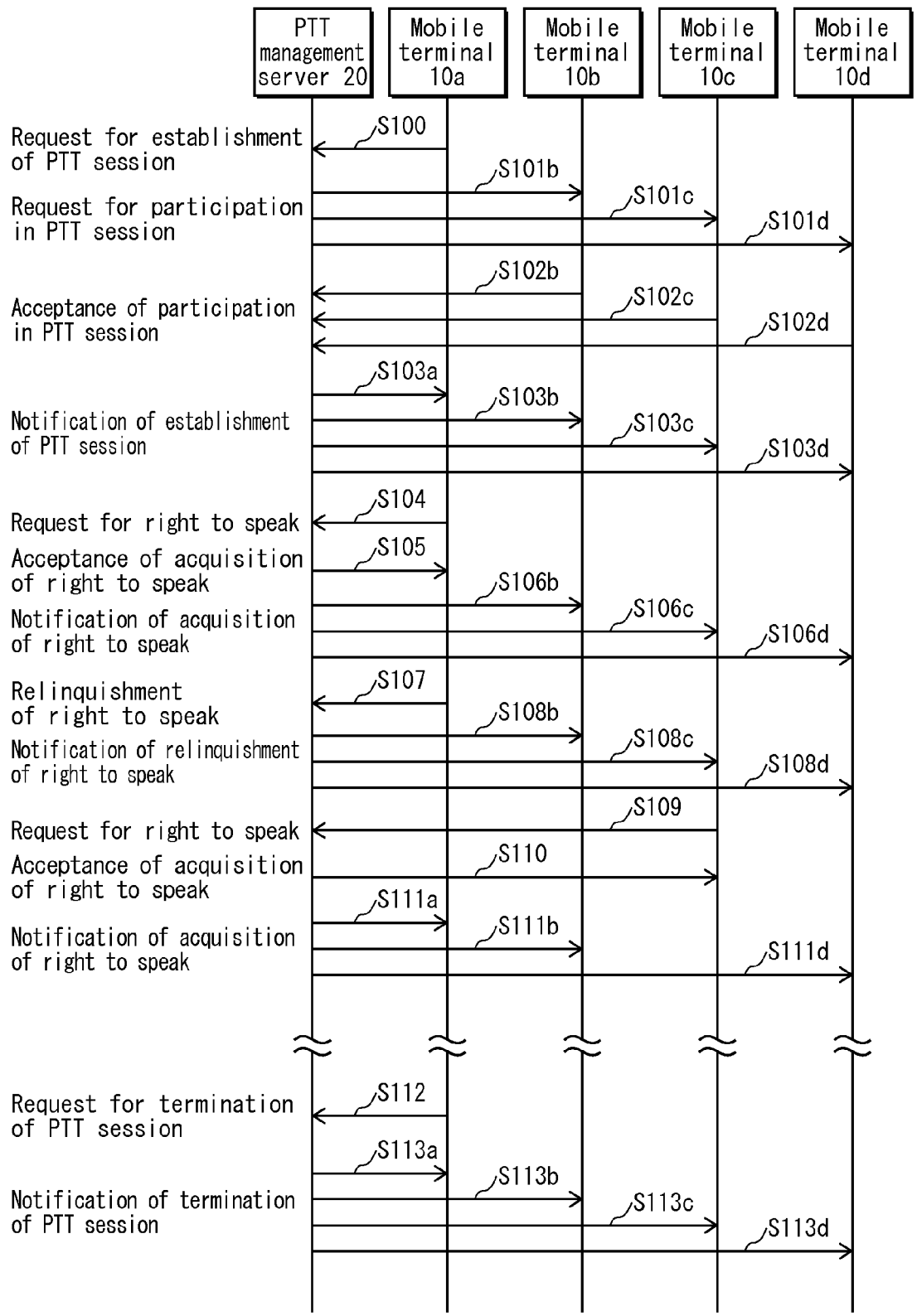
FIG. 7 illustrates an example processing sequence performed within a PTT call system 1 during a call.

The following describes operations of the PTT call system 1 during a call, with reference to FIG. 7.

FIG. 7 shows an example of a processing sequence of the PTT call system 1 during a call.

First, to make a one-to-many group call, the mobile terminal 10a requests the PTT management server 20 to establish a PTT session, appointing the mobile terminals 10b, 10c and 10d (Step S100).

Upon receipt of the request, the PTT management server 20 requests each of the mobile terminals 10b through 10d to participate in the PTT session requested by the mobile terminal 10a (Steps S101b, S101c, S101d).

Upon receipt of the request for participation, each of the mobile terminals 10b through 10d transmits information indicating acceptance of the request to participate in the PTT session to the PTT management server 20 (Steps S102b, S102c, S102d). When there is no response from a mobile terminal or there is a response indicating denial of participation in the PTT session from a mobile terminal, the PTT management server 20 does not invite such a mobile terminal to the PTT session.

Upon receipt of the information indicating acceptance of the request to participate in the PTT session, the PTT management server 20 transmits a notification of establishment of the PTT session to the mobile terminals 10a through 10d (Steps S103a, S103b, S103c, S103d). Note that the PTT management server 20 establishes the PTT session when any one of the mobile terminals accepts the request to participate in the PTT session, and the PTT management server 20 does not transmit the notification of establishment of the PTT session to the mobile terminals that did not respond to the request or did not accept the request.

After establishment of the PTT session, any one of the mobile terminals 10a through 10d can speak upon acquiring the right to speak while none of the other mobile terminals participating in the PTT session is holding the right to speak.

Completion of Step S103a through Step S103d results in establishment of the PTT session involving the mobile terminals 10a through 10d as a call group. At this point, none of the mobile terminals is holding the right to speak.

First, the mobile terminal 10a transmits a request for the right to speak to the PTT management server 20 in order to be allowed to transmit a voice (Step S104).

Upon receipt of the request for the right to speak from the mobile terminal 10a, the PTT management server 20 confirms that none of the mobile terminals 10b through 10d is holding the right to speak, then accepts the request for the right to speak and transmits a notification of the acceptance to the mobile terminal 10a (Step S105).

Furthermore, the PTT management server 20 transmits, to the mobile terminals 10b through 10d, a notification indicating that the mobile terminal 10a has acquired the right to speak (Steps S106b, S106c, S106d). The mobile terminal 10a can transmit a voice to each of the mobile terminals 10b through 10d during a period until relinquishment of the right to speak, during which each of the mobile terminals 10b through 10d receives a voice from the mobile terminal 10a.

When finishing speaking and relinquishing the right to speak, the mobile terminal 10a transmits information indicating relinquishment of the right to speak to the PTT management server 20 (Step S107). Upon receipt of the information indicating relinquishment of the right to speak from the mobile terminal 10a, the PTT management server 20 transmits, to the mobile terminals 10b through 10d, a notification indicating that the mobile terminal 10a has relinquished the right to speak (Steps S108b, S108c, S108d). Through these operations, any one of the mobile terminals 10a through 10d participating in the PTT session can acquire the right to speak next time.

In the example shown in FIG. 7, it is the mobile terminal 10c that subsequently transmits a request for the right to speak to the PTT management server 20 (Step S109). Upon receipt of the request for the right to speak from the mobile terminal 10c, the PTT management server 20 confirms that none of the mobile terminals 10a, 10b and 10d is holding the right to speak, then accepts the request for the right to speak received from the mobile terminal 10c, and transmits a notification of the acceptance to the mobile terminal 10c (Step S110).

Furthermore, the PTT management server 20 transmits, to the mobile terminals 10a, 10b and 10d, a notification indicating that the mobile terminal 10c has acquired the right to speak (Steps S111a, S111b, S106d).

The mobile terminal 10c can transmits a voice during a period until relinquishment of the right to speak, during which each of the mobile terminals 10b through 10d receives a voice from the mobile terminal 10a.

When finishing speaking and relinquishing the right to speak, the mobile terminal 10c performs the same processing as in Step S107, and the PTT management server 20 transmits, to the mobile terminals 10a, 10b and 10d, a notification indicating the relinquishment of the right to speak. Processing performed when the mobile terminal 10b or 10d transmits a voice is the same as the processing performed when the mobile terminal 10a transmits a voice. As described above, each of the mobile terminals participating in a PTT session requests for the right to speak before every speech, and transmits a voice after acquiring the right to speak.

Next, processing performed for terminating a PTT session is described below.

A PTT session is terminated by a request for terminating the PTT session made by the mobile terminal 10a that made the request for establishment of the PTT session. The mobile terminal 10a transmits a request for terminating the PTT session to the PTT management server 20 (Step S112). Upon receipt of the request for terminating the PTT session from the mobile terminal 10a, the PTT management server 20 transmits a notification of the termination of the PTT session to the mobile terminals 10a through 10d, and the mobile terminals 10a through 10d terminates the communication with the PTT management server 20 (Steps S113a, S113b, S113c, S113d). Consequently, the PTT session among the mobile terminals 10a through 10d is terminated.

1-5. Examples of User Operations

The following describes user operations of the mobile terminal 10 having the above-described configuration, with reference to FIG. 8.

Figure 8A:
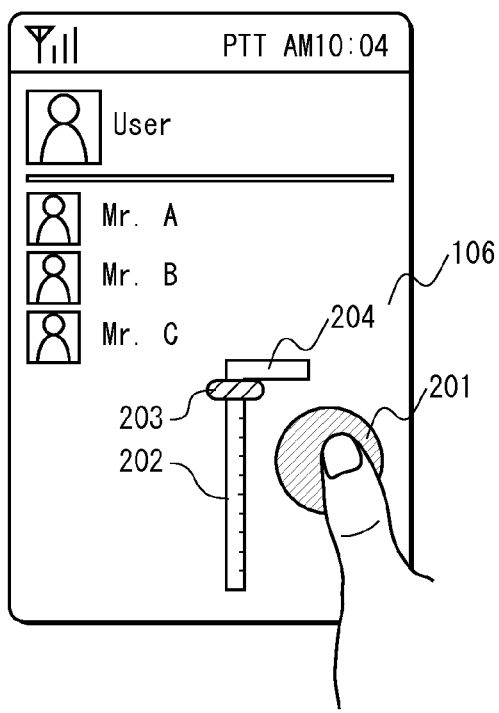
FIG. 8A illustrates example display when the PTT button is touched.

FIG. 8A illustrates the indicator 203 when the user touches the PTT button 201 to acquire the right to speak. FIG. 8B illustrates the display position of the indicator 203 when the user, after acquiring the right to speak, releases the PTT button 201, and the remaining time is approximately the half of the predefined maximum time.

When the user touches the PTT button 201 with a finger for example, the indicator 203 is displayed at the top end of the time bar 202. The countdown of the remaining time is suspended while the user is touching the PTT button 201, and the indicator 203 stays at the top end of the time bar 202 as illustrated in FIG. 8A.

When the user releases the PTT button 201, the countdown of the remaining time resumes, and accordingly the indicator 203 gradually moves along the time bar 202 over time, as illustrated in FIG. 8B. When the remaining time becomes zero, the indicator 203 is displayed at the bottom end of the time bar 202, and the mobile terminal 10 transmits a notification of the relinquishment of the right to speak to the PTT management server 20. If the user again touches the PTT button 201 before the indicator 203 is displayed at the bottom end of the time bar 202, the remaining time is extended, and the indicator 203 is displayed at the top end of the time bar 202 as illustrated in FIG. 8A.

In this way, with the mobile terminal 10 pertaining to the present embodiment, the user can visually check the remaining time to the relinquishment of the right to speak by seeing the indicator 203 displayed on the display 106. Also, the user can extend the remaining time to the relinquishment of the right to speak by touching the PTT button 201.

Figure 8C:
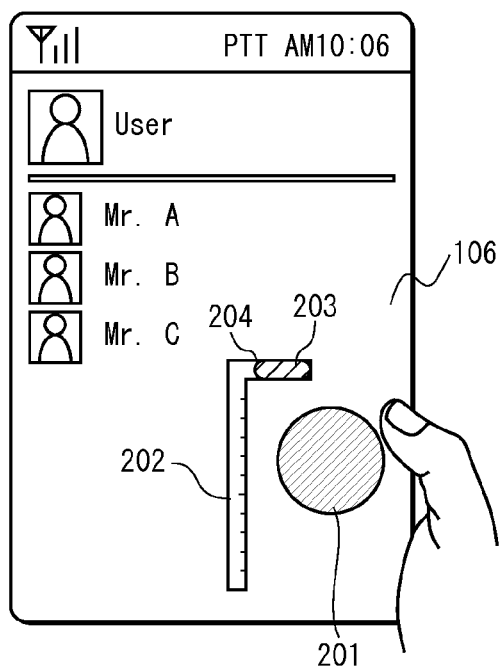
FIG. 8C illustrates an example display position of an indicator used for suspending a countdown of the remaining time.
Figure 8B:
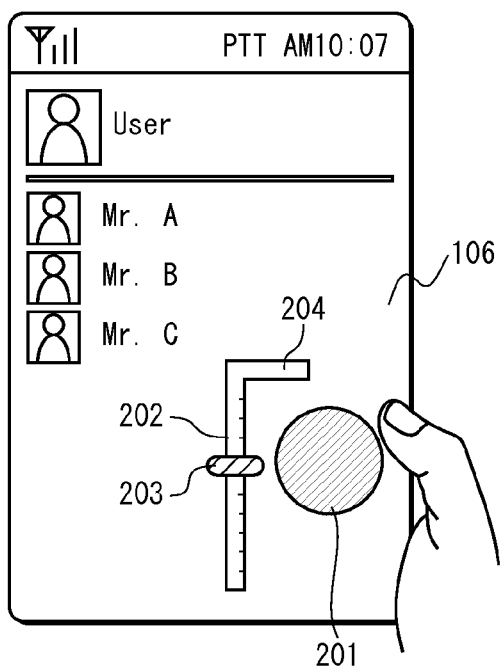
FIG. 8B illustrates example display when a finger is released from the PTT button.

FIG. 8C illustrates that the display position of the indicator 203 has been changed to the holding position 204. As illustrated in the figure, when the indicator 203 is displayed at the holding position 204, the countdown of the remaining time is suspended, and the state of the mobile terminal 10 is maintained the same as when the PTT button 201 is being touched. In the situation illustrated in FIG. 8B, the value of the remaining time can be changed by moving the display position of the indicator 203 upwards or downwards along the time bar 202. The remaining time is increased when the display position of the indicator 203 is moved upwards, and is reduced when the display position of the indicator 203 is moved downwards. The remaining time is zero when the time bar 202 reaches the bottom end. At this point, the mobile terminal 10 transmits a notification of the relinquishment of the right to speak to the PTT management server 20.

In this way, the user can increase or reduce the remaining time to the relinquishment of the right to speak by changing the display position of the indicator 203 showing the remaining time. Furthermore, the user can maintain the state of the mobile terminal 10 when the PTT button 201 is being touched without keeping touching the PTT button 201, by fixing the display position of the indicator 203 at a predefined display position.

When the indicator 203 is moved to the holding position 204, the mobile terminal 10 transmits a notification to the PTT management server 20, and accordingly the other mobile terminals participating in the PTT session via the PTT management server 20, or possibly all the mobile terminals participating in the PTT session including the mobile terminal 10, are notified of the movement. Alternatively, the other mobile terminals participating in the PTT session via the PTT management server 20, or possibly all the mobile terminals participating in the PTT session including the mobile terminal 10, are notified of the movement at predefined intervals. Thus, when the indicator 203 of a mobile terminal is moved to the holding position 204, the users of the other mobile terminals participating in the PTT session are notified of the movement. Furthermore, when the notification of the movement of the indicator 203 to the holding position 204 is made at predefined intervals, the user of the mobile terminal holding the right to speak is reminded not to forget relinquishing the right to speak.

Embodiment 2

2-1. Overview

In Embodiment 2, a mobile terminal in a PTT call system having a function of terminating a PTT session when the situation continues for a predefined period where none of the mobile terminals 10a through 10d participating in the PTT session has the right to speak.

Note that explanation of the same features as in Embodiment 1 is omitted, and differences are mainly explained below.

2-2. Configuration

Regarding the mobile terminal pertaining to the present embodiment, explanation of the same components as the mobile terminal 10 pertaining to Embodiment 1 is omitted, and differences are mainly explained below. Note that the reference numbers for the mobile terminal pertaining to the present embodiment are the same as in Embodiment 1.

The present embodiment is different from Embodiment 1 in that the controller 101 of the mobile terminal 10 provides an instruction to terminate the PTT session when the remaining time becomes zero, instead of relinquishing the right to speak. Note that unlike in Embodiment 1, the expression "remaining time" used in the present embodiment is the time from when the user stops touching the PTT button 201 to when the PTT session is to be terminated.

The storage 102 stores, instead of the predefined maximum time of a speech to be provided when the right to speak is obtained once, a value of maximum time (e.g. 5 minutes) to the disconnection of the PTT session that occurs when the situation continues for a predefined period where none of the mobile terminals participating in the PTT session has the right to speak.

Note that in the mobile terminal pertaining to the present embodiment, the indicator 203 is used for displaying the remaining time to the disconnection of a PTT session, and the indicator 203 does not accept a drag operation, unlike in Embodiment 1.

2-3. Operations

Next, the following describes operations of the mobile terminal 10 having the above-described configuration.

Figure 9:
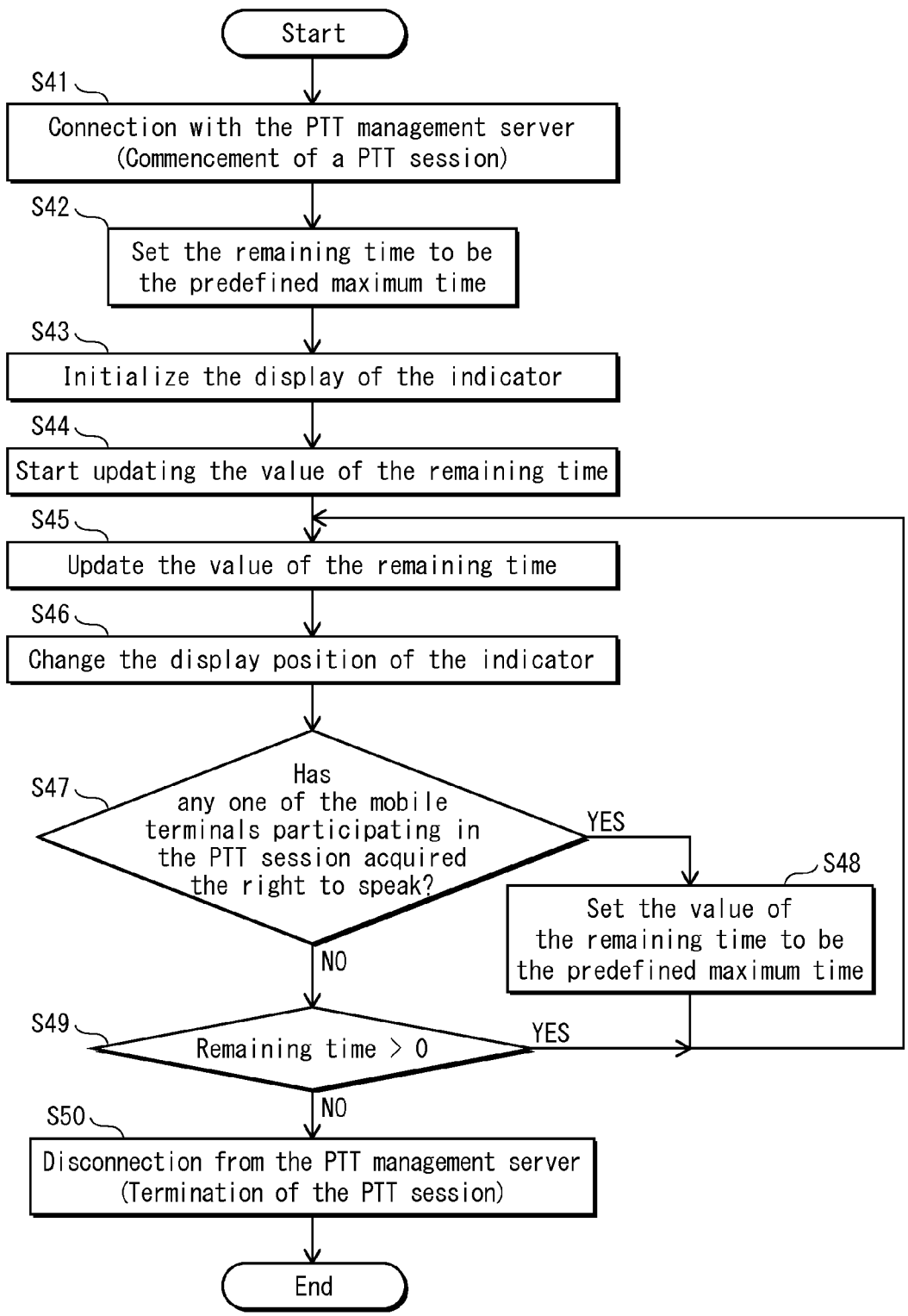
FIG. 9 is a flowchart illustrating processing for controlling the remaining time to the termination of a PTT session of the mobile terminal 10 pertaining to Embodiment 2.

FIG. 9 a flowchart illustrating processing for controlling the remaining time to the termination of a PTT session of the mobile terminal 10.

First, the mobile terminal 10 connects to the PTT management server 20, and establishes a PTT session (Step S41). Upon establishment of the PTT session, the controller 101 sets the value of the remaining time to the termination of the PTT session to be the time stored in advance in the storage 102 (e.g. 5 minutes), and transmits the value to the timer 111 (Step S42).

The display position changer 110 calculates the coordinate values of the display position of the indicator 203 on the time bar 202 when the value of the remaining time indicates the maximum time, and sends the coordinate values to the controller 101. The controller 101 instructs the display 106 to display the indicator 203 at the position specified by the coordinate values, and the display 106 displays the indicator 203 at the position indicated by the coordinate values (Step S43).

The timer 111 starts updating the value of the remaining time (Step S44), and continuously updates the value of the remaining time to the termination of the PTT session over time (Step S45).

The display position changer 110 continuously receives the value of the remaining time from the timer 111, calculates the coordinate values used for chanting the display position of the indicator 203 on the display 116 according to the remaining time, and sends the coordinate values to the controller 101. The controller 101 instructs the display 106 to display the indicator 203 at the position specified by the coordinate values, and the display 106 displays the indicator 203 at the position indicated by the coordinate values (Step S46). Note that the calculation of the display position of the indicator 203 is performed in the same manner as in Step S09 of Embodiment 1.

Next, the controller 101 determines whether any of the mobile terminals participating in the PTT session has the right to speak (Step S47). Specifically, the controller 101 determines whether the PTT button 201 of the mobile terminal 10 has been touched to acquire the right to speak. When the mobile terminal 10 has the right to speak, it is determined to be "YES" in Step S47. When the mobile terminal 10 does not have the right to speak, the controller 101 determines whether any other mobile terminal participating in the PTT session has the right to speak. As already explained with reference to FIG. 7, when one of the mobile terminals participating in the PTT session acquires the right to speak, a notification of the acquisition of the right to speak is transmitted by the PTT management server 20 to the other mobile terminals, and when the mobile terminal relinquishes the right to speak, a notification of the relinquishment of the right to speak is transmitted to the other mobile terminals. According to the notification of the relinquishment of the right to speak, each mobile terminal stores information indicating which mobile terminal has acquired and relinquished the right to speak at what time, and determines whether any other mobile terminal has the right to speak or not according to the stored information. When the controller 101 determines that one of the other mobile terminals has the right to speak, the result of the determination in Step S47 will be "YES". On the other hand, when it is determined that none of the mobile terminals, including the mobile terminal 10, does not have the right to speak, the result of the determination in Step S47 will be "NO".

In the case of "YES" in Step S47, the remaining time changer 112 changes the value of the remaining time to the value stored in advance in the storage 102 (e.g. 5 minutes), and the processing from Step S45 is repeated.

When determining that still none of the mobile terminals participating in the PTT session has the right to speak (Step S47: NO), the controller 101 determines whether the updated value of the remaining time is zero or not (Step S49). When the value of the remaining time is not zero (Step S49: YES), the processing from Step S45 is repeated, and the timer 111 continuously updates the value of the remaining time over time.

When the value of the remaining time is zero (Step S49: NO), the controller 101 transmits information indicating the termination of the PTT session to the PTT management server 20, and disconnects from the PTT management server 20 (Step S50). Upon receipt of the information indicating the termination of the PTT session from the mobile terminal 10, the PTT management server 20 transmits the information to all the other mobile terminals participating in the PTT session. Upon receipt of the information indicating the termination of the PTT session from the PTT management server 20, the other mobile terminals disconnect from the PTT management server 20.

2-4. Summary

Through the operations described above, the mobile terminal 10 pertaining to the present embodiment allows for visual indication of the remaining time to the termination of the PTT session when the situation continues for a predefined period where none of the mobile terminals participating in the PTT session has the right to speak. Also, the mobile terminal 10 can extend the remaining time to the termination of the PTT session by acquiring the right to speak.

3. Modifications

Although embodiments of the mobile terminal pertaining to the present invention are described above, the mobile terminal may be modified as described below, and the present invention is not limited to the embodiments described above.

(1) The mobile terminal 10 may exchange information related to the remaining time with the PTT management server 20, and share the information among the other mobile terminals participating in the PTT session.

Figure 10:
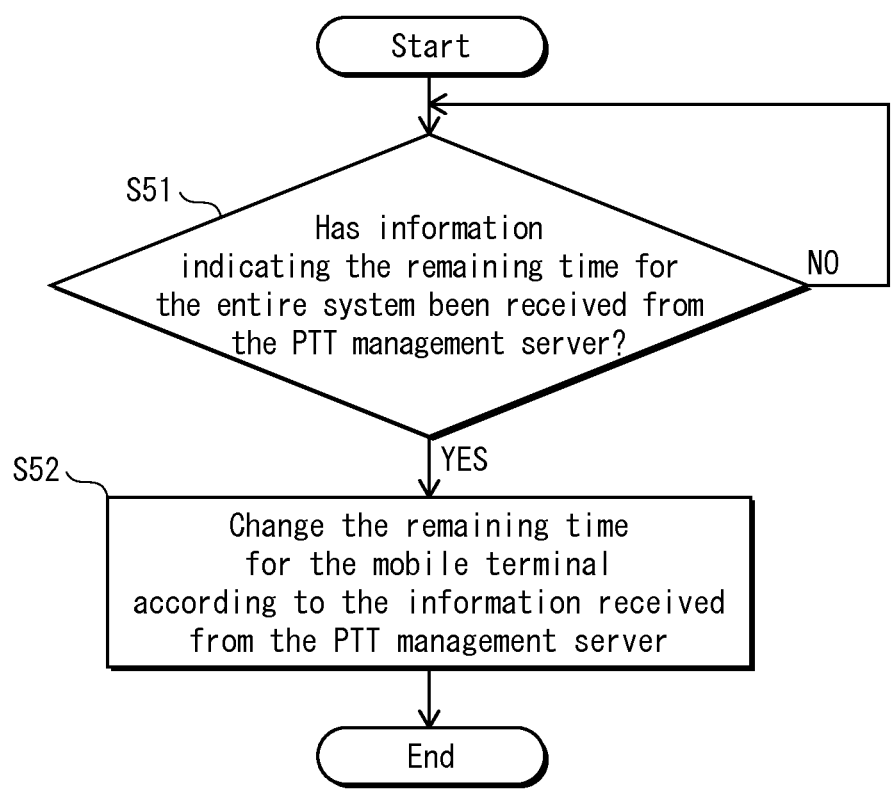
FIG. 10 is a flowchart illustrating processing performed by the mobile terminal 10 pertaining to a modification when receiving information indicating the remaining time from the PTT management server 20.

FIG. 10 is a flowchart illustrating processing performed by the mobile terminal 10 when receiving information indicating the remaining time from the PTT management server 20.

The controller 101 determines whether the communicator 107 has received information related to the remaining time (e.g. the value of the remaining time) from the PTT management server 20 via the antenna 108 (Step S51).

When it is determined that the communicator 107 has received the information related to the remaining time from the PTT management server 20 (Step S51: YES), the remaining time changer 112 changes the value of the remaining time of the mobile terminal 10 according to the information related to the remaining time, received from the PTT management server 20 (Step S52). Note that the information related to the remaining time is the value of the remaining time, for example. This processing is performed as interrupt processing during Step S07 through Step S12 in FIG. 4 and Step S44 through S49 in FIG. 9, for example.

Next, the following describes the operations of the PTT management server 20 when receiving from the mobile terminal 10 the information indicating the remaining time to the termination of the PTT session.

Figure 11:
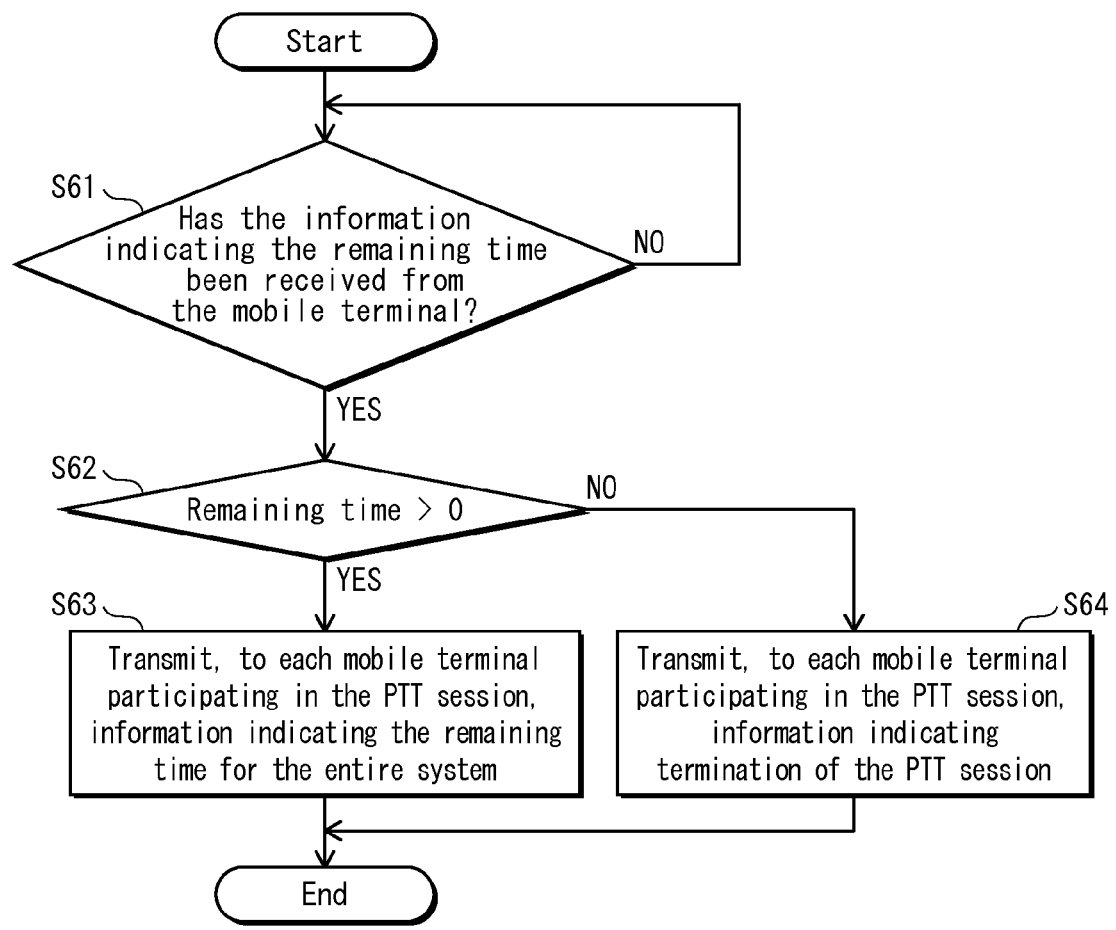
FIG. 11 is a flowchart illustrating processing performed by the PTT management server 20 when receiving information indicating the remaining time from the mobile terminal 10.

FIG. 11 is a flowchart illustrating processing performed by the PTT management server 20 when receiving the information indicating the remaining time from the mobile terminal 10.

When receiving the information indicating the remaining time from the mobile terminal 10 (Step S61: YES), the PTT management server 20 determines whether the value of the remaining time is zero or not (Step S62).

When the value of the remaining time is not zero (Step S62: YES), the PTT management server 20 transmits the information indicating the same value of the remaining time to each of the other mobile terminals participating in the PTT session (Step S63). On the other hand, when the value of the remaining time is zero (Step S62: NO), the PTT management server 20 transmits information indicating the termination of the PTT session to each of the other mobile terminals participating in the PTT session.

Through these operations, each of the mobile terminals participating in the PTT session is enabled to display the same value of the remaining time to the termination of the PTT session.

The transmission of the information indicating the remaining time from the mobile terminal 10 to the PTT management server 20 is performed when, for example, the remaining time is changed in Step S48 in FIG. 9. The mobile terminal 10 transmits the value of the remaining time to the PTT management server 20. When receiving the value of the remaining time from the mobile terminal 10, the PTT management server 20 transmits the value of the remaining time so received to the other mobile terminals participating in the PTT session. Each mobile terminal changes the display position of the indicator 203 according to the value of the remaining time received from the PTT management server 20.

Note that the information indicating the remaining time, which is received in Step S61, does not necessarily indicate the remaining time to the termination of the PTT session, and may indicate the remaining time to the relinquishment of the right to speak. If this is the case, the remaining time indicated by the information transmitted in Step S63 to each mobile terminal is the remaining time to when the mobile terminal holding the right to speak relinquishes the right to speak, and the information transmitted in Step S64 indicates the relinquishment of the right to speak. Thus each of the mobile terminals participating in the PTT session is enabled to display the same value of the remaining time to the relinquishment of the PTT session. Therefore, the users of the mobile terminals participating in the PTT session can check the remaining time to the relinquishment of the right to speak held by another mobile terminal, and can efficiently perform an operation for acquiring the right to speak in the next turn. Note that a mobile terminal not holding the right to speak may turn off the back light 123 of the display 106 upon elapse of a predefined time since the mobile terminal relinquishes the right to speak. This reduces the amount of power consumption of the mobile terminal.

(2) In Embodiment 2, the indicator 203 does not accept a drag operation. However, modification may be adopted in order to allow the user to change the remaining time by changing the display position of the indicator 203.

Note that the operation for changing the display position of the indicator 203 of the mobile terminal 10, and the calculation of the remaining time according to the display position, are performed in the same manner as described with reference to FIG. 6 for Embodiment 1.

Furthermore, when the remaining time to the termination of the PTT session is changed by a drag operation on the indicator 203 of a mobile terminal, the value of the remaining time may be transmitted to the PTT management server 20 so that the PTT management server 20 and the other mobile terminals can display the same value of the remaining time.

If this is the case, the value of the remaining time is transmitted to the PTT management server 20 upon completion of Step S34 and Step S39 in FIG. 6.

The value of the remaining time transmitted to the PTT management server 20 is transmitted to the other mobile terminals participating in the PTT session through the processing described in Modification (1) above. Each mobile terminal updates the remaining time to the termination of the PTT, and the display position of the indicator 203 displayed on each of the mobile terminals changes accordingly. Through these operations, when the value of the remaining time to the termination of the PTT session is updated by any one of the mobile terminals participating in the PTT session, the updated value of the remaining time is transmitted to all the mobile terminals participating in the PTT session, so that all the mobile terminals can display the same remaining time.

(3) In Embodiment 2, a PTT session is terminated when the value of the remaining time becomes zero. Alternatively, however, modification may be adopted so that only the mobile terminal 10 exits from the PTT session. If this is the case, the mobile terminal 10 transmits, to the PTT management server 20, information indicating that the mobile terminal 10 has exited from the PTT session, instead of the information indicating the termination of the PTT session. Upon receipt of the withdrawal from the PTT session from the mobile terminal 10, the PTT management server 20 transmits, to the other mobile terminals participating in the PTT session, information indicating that the mobile terminal 10 has withdrawn from the PTT session. Through these operations, only the mobile terminal 10 withdraws from the PTT session, and the PTT session is maintained by the other mobile terminals.

In Embodiment 2, the request for terminating a PTT session is made from the mobile terminal that has made the request for establishing the PTT session. In this modified example, however, any of the mobile terminals participating in the PTT session can request the PTT management server 20 to terminate the PTT session.

(4) In embodiments above, the image indicating the remaining time, which is displayed on the display 106 as shown in FIG. 3, is not necessarily exactly the same as shown in FIG. 3. The image may be configured in any manner insofar as it allows for an operation for changing the remaining time.

Figure 12A:
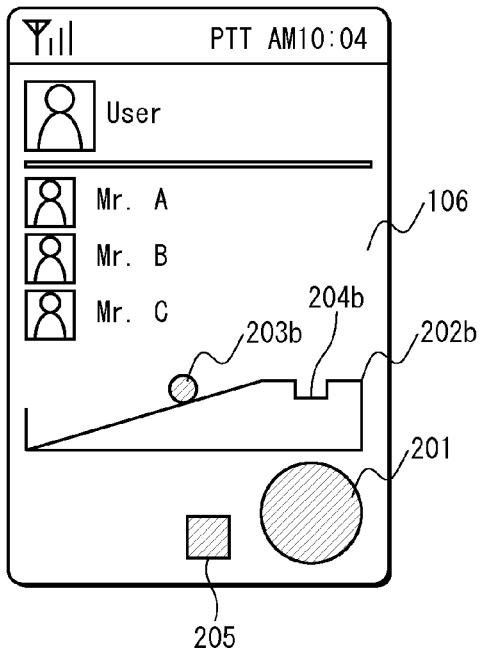
FIG. 12A illustrates a modification of display when the PTT button is touched.
Figure 12C:
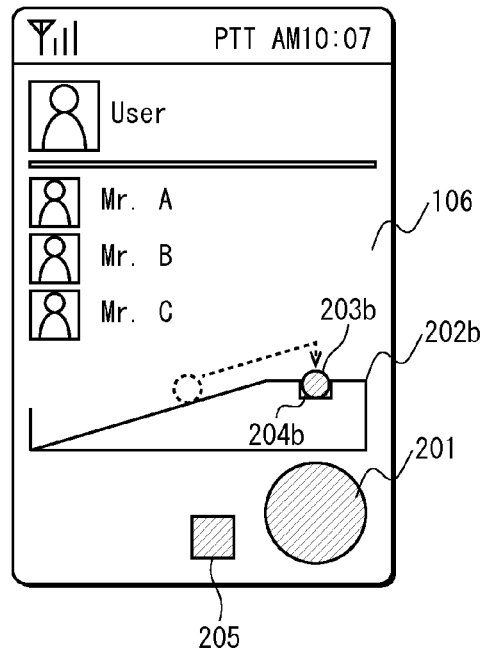
FIG. 12C illustrates a modification of the display position of the indicator used for halting the countdown of the remaining time.
Figure 12B:
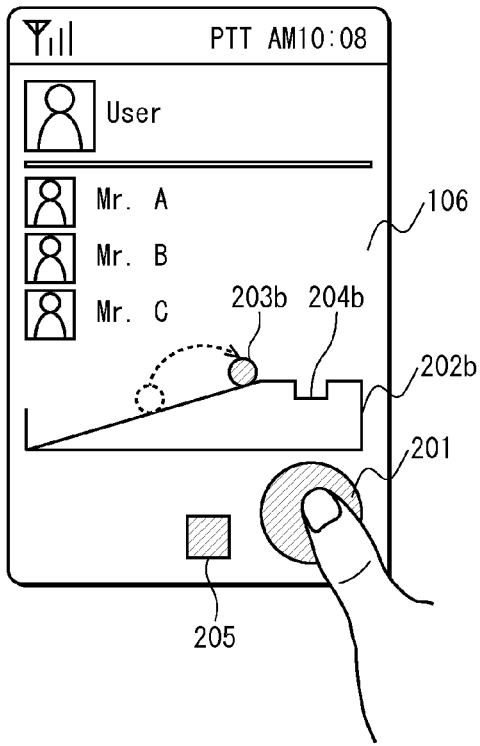
FIG. 12B illustrates a modification of display when the finger is released from the PTT button.

For example, the image may be configured as shown in FIGS. 12A through 12C.

In FIG. 12A, the remaining time is expressed by an indicator 203b going down the slope of the time bar 202b over time. The indicator 203b located at the bottom end of the slope shows that the remaining time is zero. FIG. 12B shows that the indicator 203b returns to the top end of the slope and the remaining time is extended when the PTT button 201 is touched under the situation shown in FIG. 12A.

FIG. 12C shows a situation where the display position of the indicator 203b has been changed to a holding position 204b. In this situation, the remaining time is not counted down, and the indicator 203b is maintained at the holding position 204b.

Furthermore, a relinquishment button 205 for relinquishing the right to speak may be provided as shown in FIG. 12, and when the relinquishment button 205 is touched, the remaining time may be set to zero and the right to speak may be relinquished immediately.

(5) The display position of the indicator 203 is not necessarily proportional to the remaining time insofar as the user can know the remaining time. For example, the time bar 202 may be configured such that the period from the predefined maximum remaining time to the midpoint corresponds to a fourth of the length of the time bar 202, and the period from the midpoint to zero corresponds to three-fourths of the length of the time bar 202 so that the elapse of time during this period can be displayed in further detail. If this is the case, when L0 denotes the length of the time bar 202, T0 denotes the predefined maximum value of the remaining time, and T denotes the remaining time, the distance L of the indicator 203 from the bottom end of the time bar 202 is represented by $L=(1-T/T0) \times L0/2$ when $T>T0/2$, and $L=(3T/2T0) \times L0$ when $T \leq T0/2$.

Thus, the elapse of the remaining time in further detail can be presented to the user when the remaining time is running out.

(6) In Embodiment 1, when the display position of the indicator 203 indicating the remaining time of the right to speak is changed to the holding position 204, the remaining time is not counted down, the mobile terminal 10 remains in the same state as when the PTT button 201 is being touched. Here, the right to speak may be automatically relinquished when a predefined period (e.g. 60 seconds) has elapsed under this situation without the user's speech. The determination as to whether the user is speaking or not can be made based on the level of audio input to the microphone. Specifically, it is determined that the user is speaking when the level of audio input to the microphone is higher than a predefined level, and otherwise, it is determined that the user is not speaking.

This configuration prevents a problem that the user does nothing for a long time despite having the right to speak and the other participants cannot acquire the right to speak.

(7) In Embodiment 1, the remaining time is extended to the maximum time stored in advance in the storage 102 when the PTT button 201 is touched. However, the remaining time may be extended by predefined time each time the PTT button 201 is touched. For example, the time by which the remaining time is extended when the PTT button is touched once may be set to be shorter than the maximum time (e.g. 5 seconds), which allows for more flexible control of the remaining time.

(8) The mobile terminal 10 may further include a proximity sensor (not illustrated) that detects whether an object is in the proximity to the sensor, and a hardware button used for PTT calls (not illustrated. hereinafter referred to as "PTT hard button"). The proximity sensor is, for example, an infrared sensor, which detects an object in the proximity to the sensor by transmitting infrared light and receiving reflection light from an object. When the proximity sensor detects an approaching object during a PTT session, the controller 101 invalidates or does not accept input from the touchpad 121, and accept input from the hardware button for PTT calls. When the proximity sensor does not detects an approaching object, the controller 101 validates or accepts input from the touchpad 101, and invalidates operations on the hardware button for PTT calls. This configuration improves, for example, operability when the user uses the mobile terminal 10 in the same manner as common mobile telephones, by placing the speaker 104 on the ear. Note that the proximity sensor may be located adjacent to the speaker of the mobile terminal 10. Note that the object mentioned above is an object that reflects infrared light, such as the user's face.

Figure 13:
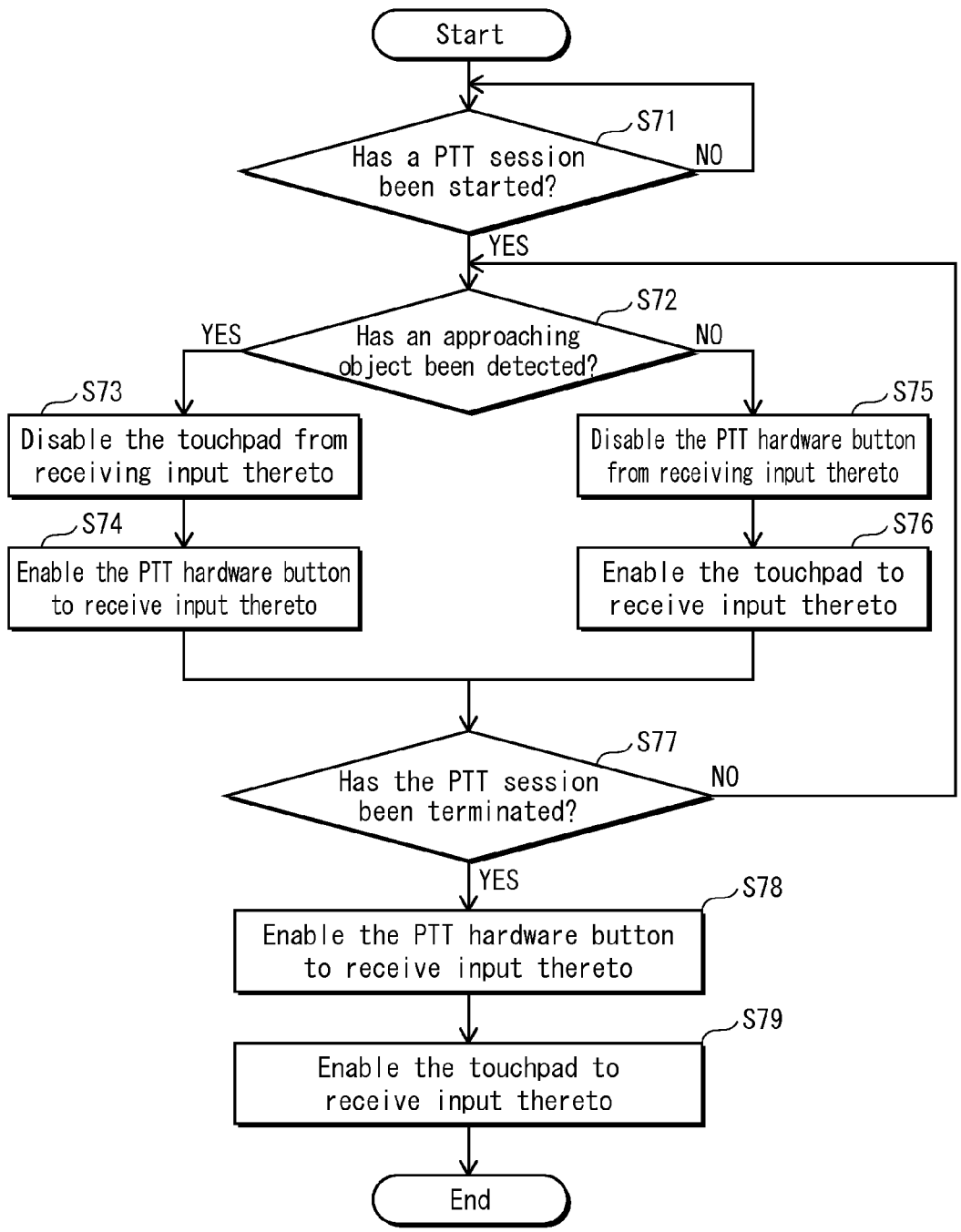
FIG. 13 is a flowchart illustrating processing of switching between an operation with a PTT button 201 and an operation with a hardware button for PTT calls.

FIG. 13 is a flowchart illustrating processing of switching between an operation with the PTT button 201 and an operation with the hardware button for PTT calls.

The controller 101 determines whether a PTT session has been started or not (Step S71). Specifically, the controller 101 of the mobile terminal 10 requests the PTT management server 20 to establish a PTT session, and determines that a PTT session has been started when receiving a notification of establishment of a PTT session from the PTT management server 20, or when another terminal makes a request for participation in the PTT session via the PTT management server 20 and the PTT management server 20 accepts the request.

When it is determined that the PTT session has been started (Step S71: YES), the proximity sensor determines whether the user's face, for example, is approaching the proximity sensor. When the proximity sensor determines that the object such as the user's face is approaching the proximity sensor (Step S72: YES), the controller 101 disables the touchpad 121 from receiving input thereto (Step S73), and enables the PTT hard button to receive input thereto (Step S74). On the other hand, in the case of NO in Step S72, i.e., when the proximity sensor detects that an object such at the user's face is not approaching the proximity sensor, the controller 101 disables the PTT hard button from receiving input thereto (Step S75), and enables the touchpad 121 to receive input thereto (Step S76).

Next, the controller 101 determines whether the PTT session has been terminated (Step S77). Specifically, the controller 101 makes the determination as to termination of the PTT session by determining whether the mobile terminal 10 has requested the PTT management server 20 to terminate the PTT session, and whether the mobile terminal 10 has received the notification of the termination of the PTT session from the PTT management server 20.

When it is determined that the PTT session has not been terminated (Step S77: NO), the controller 101 repeats processing from Step S72, and enables the PTT button 201 displayed on the touchpad or the PTT hard button in order to accept the above-described PTT button operation according to the way of the use of the mobile terminal 10.

When it is determined that the PTT session has been terminated (Step S77: YES), the controller 101 enables the PTT hard button to receive input thereto (Step S78), and enables the touchpad 121 to receive input thereto (Step S79).

As described above, when the user uses the mobile terminal 10 while seeing the display 106, the user can operate the touchpad 121, and when the user uses the mobile terminal 10 in the same manner as common mobile phones by placing the speaker on the ear, the user can operate the PTT hard button in a conventional manner, instead of the touchpad 121.

(9) In the embodiments above, the functions of the controller of the mobile terminal are realized by a computer program. However, all or some of the functions performed by the controller may be realized with a single-chip or multiple-chip integrated circuit or any others.

(10) Among the constituent elements described in the embodiments, the controller, the contact detector, the display position changer, the timer, the remaining time changer and the communicator may be realized with a single-chip or multiple-chip integrated circuit, computer programs, or any others. These constituent elements cooperate with the processor of the mobile terminal to realize the respective functions.

The programs may be recorded on a recording medium or distributed via various communication channels. Examples of such a recording medium includes an IC card, a hard disk, an optical disc, a flexible disk, ROM, a flash memory, and so on.

The distributed programs are stored in a memory or the like that is readable by a processor of the mobile terminal, and the functions of the mobile terminal described in embodiments above are realized by the processor executing the programs.

(11) The above-described embodiments and modifications may be partially combined.

4. Supplemental Descriptions

The following further explains the configuration of the mobile terminal pertaining to one aspect of the present invention, modifications applicable to the mobile terminal, and advantageous effects of the mobile terminal.

(1) A mobile terminal pertaining to an embodiment of the present invention is a mobile terminal having a push-to-talk (PTT) function, comprising: a controller that, upon detection of an operation for terminating a predefined call mode, maintains the predefined call mode for a period of predefined time, and terminates the predefined call mode upon elapse of the period; a display that displays remaining time to termination of the predefined call mode; and a remaining time changer that, upon detection of an operation for changing the remaining time, changes the remaining time according to the operation for changing the remaining time.

This mobile terminal maintains the predefined call mode for a predefined period even when an operation for terminating the predefined call mode is detected, and displays the remaining time to the termination of the mode. Furthermore, the user can change the remaining time by a predefined operation. Therefore, even when the user mistakenly releases the PTT button, the mobile terminal can maintain the mode for acquiring the right to speak and making a call, and can maintain the PTT session, thereby preventing unintended disconnection of a call or a PTT session.

(2) The display may include a touch panel, and displays, on the touch panel, a button used for acquiring a right to speak in PTT, the mobile terminal further comprises a contact detector that detects contact with the touch panel, and the remaining time changer changes the remaining time when the contact detector detects contact with the button.

With this mobile terminal, when the button displayed on the touch panel, used for acquiring the right to speak, is touched, the remaining time to the predefined call mode is changed to a predefined time.

Therefore, when the remaining time is running out, the user can extend the remaining time to the redefined time by touching the button.

(3) The mobile terminal may further comprise a timer that starts updating the remaining time when contact with the button detected by the contact detector is lost.

With this mobile terminal, the countdown of the remaining time is started after the user touches the button displayed on the touch panel and stops touching the button, i.e., when the user releases the PTT button.

(4) The touch panel may display an image indicating the remaining time at a display position on a predefined path, the display position corresponding to the remaining time, the mobile terminal may further comprise a display position changer that changes the display position of the image on the predefined path in response to an operation for moving the image along the predefined path, and the remaining time changer may change the remaining time according to the display position so changed.

With this mobile terminal, the user can change the remaining time to the termination of the predefined call mode by changing the display position of the image representing the remaining time. The remaining time changes according to the display position of the image.

Therefore, the user can control the remaining time to the relinquishment of the right to speak or the remaining time to the termination of the PTT session by a simple operation.

(5) The display position changer, upon a user operation of dragging the image to a predefined position that is out of the predefined path, may change the display position of the image to the predefined position, the remaining time changer, when the display position of the image is moved to the predefined position, may change the remaining time to the predefined time, and the timer may suspend updating the remaining time until the display position of the image is moved back to the predefined path by a user operation.

With this mobile terminal, when an operation is made to move the image representing the remaining time to a predefined display position that is out of a predefined path for representing the remaining time, the image representing the remaining time is moved to the predefined display position, the remaining time is changed to a predefined time, and the countdown of the remaining time is thereby suspended.

Therefore, even when the user releases the PTT button, the mobile terminal is maintained in the same state as when the PTT button is being touched.

(6) The predefined call mode may be a mode of holding a right to speak in PTT, and the controller may relinquish the right to speak when the remaining time is zero.

This mobile terminal displays the remaining time to the relinquishment of the right to speak, and relinquishes the right to speak when the remaining time becomes zero.

Therefore, the user can know the remaining time to the relinquishment of the right to speak while not touching the PTT button.

(7) The predefined call mode may be a mode of establishing a PTT session, and the controller may terminate the PTT session when the remaining time is zero.

This mobile terminal displays the remaining time to termination of the PTT session, and terminates the PTT session when the remaining time becomes zero.

Therefore, when releasing the PTT button, the user can know the remaining time to the termination of the PTT session.

(8) The mobile terminal may further comprise a communicator that exchanges information related to the remaining time with an external PTT management server, and when the communicator receives the information from the external PTT management server, the remaining time changer may change the remaining time according to the information received from the external PTT management server.

This mobile terminal can change the remaining time thereof based on information related to the remaining time, received from the external PTT management server.

Therefore, the same remaining time can be set to the PTT management server and all the mobile terminals participating in the PTT session.

(9) When the remaining time changer changes the remaining time according to the operation for changing the remaining time, the communicator may transmit to the external PTT management server the information related to the remaining time so changed.

This mobile terminal can transmit information related to the remaining time held thereby to the external PTT management server when the remaining time is changed by a user operation. The PTT management server can transmit the remaining time to the other mobile terminals, and therefore the same remaining time can be set to the PTT management server and all the mobile terminal participating in the PTT session.

(10) The mobile terminal may further comprise: a proximity sensor that detects an approaching object; a hardware button that is used for acquiring a right to speak in PTT; and an input controller that disables the touch panel from receiving input thereto and enables the hardware button to receive input thereto when the proximity sensor detects an approaching object, and enables the touch panel to receive input thereto and disables the hardware button from receiving input thereto while the proximity sensor is not detecting an approaching object.

This mobile terminal, when the proximity sensor detects that the user's face, for example, is approaching the mobile terminal, enables the hardware button to accept an operation for acquiring the right to speak in a PTT call and disables the touch panel.

Therefore, the user can use the mobile terminal while operating the hardware button, in the same manner as common mobile phones.

(11) A mobile terminal control method pertaining to an embodiment of the present invention is a method for controlling a mobile terminal having a push-to-talk (PTT) function, comprising: maintaining, upon detection of an operation for terminating a predefined call mode, the predefined call mode for a period of predefined time, and terminating the predefined call mode upon elapse of the period; displaying remaining time to termination of the predefined call mode; and changing, upon detection of an operation for changing the remaining time, the remaining time according to the operation for changing the remaining time.

The method having the stated configuration for controlling a mobile terminal maintains the predefined call mode for a predefined period even when an operation for terminating the predefined call mode is detected, and displays the remaining time to the termination of the mode. Furthermore, the user can change the remaining time by a predefined operation.

Therefore, even when the user mistakenly releases the PTT button, the mobile terminal can be controlled in order to prevent sudden disconnection of a call during a speech.

(12) A mobile terminal control program pertaining to an embodiment of the present invention is a control program for controlling a mobile terminal having a push-to-talk (PTT) function, the control program causing the mobile terminal to perform the steps of: maintaining, upon detection of an operation for terminating a predefined call mode, the predefined call mode for a period of predefined time, and terminating the predefined call mode upon elapse of the period; displaying remaining time to termination of the predefined call mode; and changing, upon detection of an operation for changing the remaining time, the remaining time according to the operation for changing the remaining time.

The program having the stated configuration for controlling a mobile terminal maintains the predefined call mode for a predefined period even when an operation for terminating the predefined call mode is detected, and displays the remaining time to the termination of the mode. Furthermore, the user can change the remaining time by a predefined operation.

Therefore, even when the user mistakenly releases the PTT button, the mobile terminal can be controlled in order to prevent sudden disconnection of a call during a speech.

INDUSTRIAL APPLICABILITY

The mobile terminal pertaining to one aspect of the present invention can be used for realizing one-to-many group calls.

REFERENCE SIGNS LIST

1. PTT call system
20 PTT management server
21 communication network
10, 10a, 10b, 10c, 10d mobile terminal
101 controller
102 storage
103 I/O
104 speaker
105 microphone
106 display
107 communicator
108 antenna
109 contact detector
110 display position changer
111 timer
112 remaining time changer
201 PTT button
202, 202b time bar
203, 203b indicator
204, 204b holding position
205 relinquishment button

The invention claimed is:

1. A mobile terminal comprising a push-to-talk (PTT) function, comprising:
a controller configured to, when a first operation for terminating a predefined mode of PTT is detected, maintain the predefined mode for a period of predefined time, and terminates the predefined mode upon elapse of the period;
a display configured to display remaining time to termination of the predefined mode during the predefined mode; and
a remaining time changer configured to, when a second operation for changing the remaining time during the predefined mode is detected, change the remaining time according to the second operation.

2. The mobile terminal of claim 1, wherein
the display comprises a touch panel, and displays, on the touch panel, a button used for acquiring a right to speak in PTT,
the mobile terminal further comprises a contact detector, wherein the contact detector is configured to detect contact with the button, and
the remaining time changer changes the remaining time when the contact detector detects the contact.

3. The mobile terminal of claim 2, further comprising
a timer configured to start updating the remaining time when the contact is lost.

4. The mobile terminal of claim 3, wherein
the touch panel displays an indicator at a display position on a predefined path, the display position being determined by the remaining time,
the mobile terminal further comprises a display position changer that changes the display position of the indicator on the predefined path in response to an operation for moving the indicator along the predefined path, and
the remaining time changer changes the remaining time according to the display position so changed.

5. The mobile terminal of claim 4, wherein
the display position changer, upon detection of a user operation of dragging the indicator to a predefined position that is out of the predefined path, changes the display position of the indicator to the predefined position that is out of the predefined path,
the remaining time changer, when the display position of the indicator is changed to the predefined position, changes the remaining time to the predefined time, and
the timer suspends updating the remaining time until detection of a user operation of dragging the indicator back to the predefined path.

6. The mobile terminal of claim 5, wherein
the predefined mode comprises a mode of holding a right to speak in PTT, and
the controller relinquishes the right to speak when the remaining time is zero.

7. The mobile terminal of claim 5, wherein
the predefined mode comprises a mode of establishing a PTT session, and
the controller terminates the PTT session when the remaining time is zero.

8. The mobile terminal of claim 6, further comprising
a communicator configured to receive information related to the remaining time from an external PTT management server, wherein
when the communicator receives the information, the remaining time changer changes the remaining time according to the information.

9. The mobile terminal of claim 7, further comprising
a communicator configured to receive information related to the remaining time from an external PTT management server, wherein
when the communicator receives the information the remaining time changer changes the remaining time according to the information.

10. The mobile terminal of claim 8, wherein
when the remaining time changer changes the remaining time according to the second operation, the communicator transmits to the external PTT management server information related to the remaining time so changed.

11. The mobile terminal of claim 9, wherein
when the remaining time changer changes the remaining time according to the second operation, the communicator transmits to the external PTT management server information related to the remaining time so changed.

12. The mobile terminal of claim 6, further comprising:
a proximity sensor configured to detect an approaching object;
a hardware button that is used for acquiring a right to speak in PTT; and
an input controller configured to disable the touch panel from receiving input thereto and enable the hardware button to receive input thereto when the proximity sensor detects an approaching object, and enable the touch panel to receive input thereto and disable the hardware button from receiving input thereto while the proximity sensor is not detecting an approaching object.

13. A method for controlling a mobile terminal comprising a push-to-talk (PTT) function, comprising:
maintaining, when a first operation for terminating a predefined mode of PTT is detected, the predefined mode for a period of predefined time, and terminating the predefined mode upon elapse of the period;
displaying remaining time to termination of the predefined mode during the predefined mode; and
changing, when a second operation for changing the remaining time during the predefined mode is detected, the remaining time according to the second operation.

14. A non-transitory computer readable recording medium having recorded thereon a control program for controlling a mobile terminal comprising a push-to-talk (PTT) function, the control program causing the mobile terminal to perform the steps of:
maintaining, when a first operation for terminating a predefined mode of PTT is detected, the predefined mode for a period of predefined time, and terminating the predefined mode upon elapse of the period;
displaying remaining time to termination of the predefined mode during the predefined mode; and
changing, when a second operation for changing the remaining time during the predefined mode is detected, the remaining time according to the second operation.

* * * * *